(12) United States Patent
Han et al.

(10) Patent No.: US 7,199,909 B2
(45) Date of Patent: Apr. 3, 2007

(54) SCANNER PROJECTION SYSTEM

(75) Inventors: Loi Han, Alhambra, CA (US); Wen Shu "Bonnie" Chen, Hsinchu (TW); Yu-Cheng Sheng, Rancho Palos Verdes, CA (US)

(73) Assignee: Microtek International, Inc., Hsinchu (TW)

( * ) Notice: Subject to any disclaimer, the term of this patent is extended or adjusted under 35 U.S.C. 154(b) by 1217 days.

(21) Appl. No.: 09/732,315

(22) Filed: Dec. 7, 2000

(65) Prior Publication Data

US 2001/0000979 A1    May 10, 2001

Related U.S. Application Data

(63) Continuation-in-part of application No. 09/436,712, filed on Nov. 9, 1999, now Pat. No. 6,608,707.

(51) Int. Cl.
*H04N 1/04* (2006.01)
*H04N 1/32* (2006.01)
*H04N 1/393* (2006.01)

(52) U.S. Cl. ............ 358/474; 358/442; 358/443; 358/445; 358/451; 358/468; 358/487; 358/497; 358/505; 358/506; 358/527; 353/122

(58) Field of Classification Search .......... 358/497, 358/494, 474, 444, 404, 452, 468, 451, 487, 358/527, 505, 506, 525, 1.2, 442, 453, 909.1, 358/445, 443; 348/96, 97, 734; 382/298–300, 382/312, 319, 318; 345/629, 625, 207, 104, 345/700, 764; 710/62, 72; 353/122

See application file for complete search history.

(56) References Cited

U.S. PATENT DOCUMENTS

| | | | |
|---|---|---|---|
| 4,475,130 A | 10/1984 | Miller et al. | 358/296 |
| 4,506,342 A | 3/1985 | Yamamoto | 707/205 |
| 4,943,867 A | 7/1990 | Suetaka et al. | 358/909.1 |
| D313,986 S | 1/1991 | Matsumoto | D14/466 |
| 5,068,905 A * | 11/1991 | Hackett et al. | 382/299 |
| 5,103,319 A | 4/1992 | Ito et al. | 358/406 |
| 5,105,284 A | 4/1992 | Sakata et al. | 358/404 |
| 5,172,237 A | 12/1992 | Blonstein et al. | 382/166 |
| 5,231,511 A | 7/1993 | Kodama et al. | 358/909.1 |
| 5,353,360 A | 10/1994 | Obara | 382/321 |
| 5,381,020 A | 1/1995 | Kochis et al. | 250/566 |
| 5,479,269 A | 12/1995 | Bronnenberg et al. | 358/403 |
| 5,532,846 A | 7/1996 | Brook et al. | 358/497 |
| 5,555,105 A | 9/1996 | Shahir et al. | 358/473 |
| 5,631,745 A * | 5/1997 | Wong et al. | 358/434 |
| 5,754,713 A * | 5/1998 | Deguchi et al. | 382/313 |
| 5,838,364 A * | 11/1998 | Ishibe et al. | 348/96 |
| 6,567,190 B1 * | 5/2003 | Reele | 358/474 |

* cited by examiner

*Primary Examiner*—Cheukfan Lee
(74) *Attorney, Agent, or Firm*—Lewis Brisbois; Bisgaard & Smith LLP; Jon E. Hokanson, Esq.

(57) ABSTRACT

A stand alone flat bed scanner including a CPU, a removable storage medium, a control system displaying digital image and controls for controlling the mode of operation, degree of resolution, related parameters associated with generating, storing and displaying digital data. Ports for printers, accessories and other peripherals, an internal hard drive, and software adapted to display images directly on a television screen, and/or to display images projected from an LCD projector upon a screen, including battery, and a pivotal handle for portable use in environments not having an external power supply. One embodiment, not including an incorporated flat bed scanner function, adapted to receive image data from a conventional scanner unit.

20 Claims, 16 Drawing Sheets

SCANNER PROJECTION SYSTEM

RELATED APPLICATION

This application is a continuation-in-part of application for patent Ser. No. 09/436,712, filed Nov. 9, 1999, entitled "Scanner With Removable Data Storage Media" and now U.S. Pat. No. 6,608,707, issued Aug. 19, 2003.

BACKGROUND OF THE INVENTION

A. Field of the Invention

The present invention is directed to a stand alone, flat bed scanner which incorporates removable digital storage media such as a floppy disk, disk drive or similar portable data storage media; a battery power supply; a central processing unit; a pivotal handle; an automatic document feed capability; and/or capability to output directly to a printer, a television screen and/or a multimedia projector.

B. Description of the Prior Art

Stand alone, flatbed scanners and portable, hand-held scanners are known. Also, use of a removable digital data storage device, such as a floppy disk, in conjunction with a digital camera is known, such as found in the Sony brand, Mavica digital camera. However, it is not known to include a central processing unit, removable storage media, portable capability, automatic document feed capability and/or the capability to output data to a liquid crystal display (LCD) multimedia projector, which in turn may then project the data onto a screen.

OBJECTS AND SUMMARY OF THE INVENTION

It is an object of the present invention to provide a scanner that incorporates a removable digital data storage media.

It is a further object of the present invention to provide a stand alone, scanner incorporating a 3.5 inch floppy diskette as a removable digital data storage media.

It is also an object of the present invention to provide a reflective/transmissive scanner incorporating a removable digital data storage media.

It is also an object of the present invention to provide a portable, hand-held scanner incorporating a removable digital data storage media such as a 3.5 inch floppy diskette.

It is a further object of the present invention to provide a CCD or CIS scanner having as an option, a removable digital data storage media such as a 3.5 inch floppy diskette, a Zip-Drive, CD Rom, or the equivalent.

It is a further object of the present invention to provide a flat bed scanner including a central processing unit for controlling scanning functions, and to provide the capability of output directly to a printer, to a television monitor, to a computer network and/or to an LCD projector.

It is a further object of the present invention to provide a stand alone flat bed scanner having an internal power supply, such as a rechargeable battery.

It is a further object of the present invention to provide a stand alone scanner having a handle for portable use.

With reference to the above-described objects, the present invention provides a scanner of the type used as a stand-alone computer peripheral, but in combination with a removable digital data storage medium such as a 3.5 inch floppy diskette, a Zip-Drive®, or the equivalent portable data storage media. Incorporation of a portable digital data storage media directly in the scanner eliminates the need to have a computer operatively connected to the scanner during the scanning process, i.e., conversion of an object image into digital data signals. With the present invention, an object image may be converted into digital data, stored in the portable memory media, and the portable memory may be removed from the scanner, to be used subsequently and in digital processing equipment not operatively connected to the scanner which obtained the image.

The present invention also provides a stand alone scanner that may include a central processing unit, and software adapted to control the scanning, editing, input and output functions related to the scanning process. The stand alone scanner alternate embodiments of the present invention include not only removable digital data storage media, but also provide for output of the digital data directly to a printer, directly to a television screen, directly to a computer network and/or directly to an LCD projector. In one embodiment of the present invention, a built-in power supply and a carrying handle are provided so that the stand-alone scanner may be easily carried and be used in environments where no external power supply is available. The stand-alone embodiments of the present invention may use CPUs of different capacity, with more advanced functions being available using higher level CPUs, and having greater memory capacity.

DESCRIPTION OF THE PREFERRED EMBODIMENTS

Referring to FIGS. 1 through 25, several preferred embodiments of the present invention will be described. The present invention is directed to stand-alone, computer peripheral scanners which, in their conventional form, include a connection to and requirement that they be operatively connected to a computer for processing digital signals sent by either the charged couple device ("CCD") or a contact image sensor ("CIS") incorporated within the scanner. The digital signals are then processed in the computer, and stored in a conventional storage media, such as a removable hard drive, 3.5 inch floppy disk, Zip-Drive® or the equivalent. The present invention is directed to incorporation of removable, or portable data storage media, i.e., memory, within the scanner itself. The present invention, therefore, enables the user to scan an image with, and store the digital data representation of the image in, a portable memory in the scanner itself, and eliminates the need for having a computer operatively connected thereto during the scanning process. The scanned image may then be stored on the portable memory, such as a 3.5 inch floppy disk, for example. The disk then may be removed from the scanner upon completion of scanning, and may be taken to a remote computer for further processing.

Figure 1:
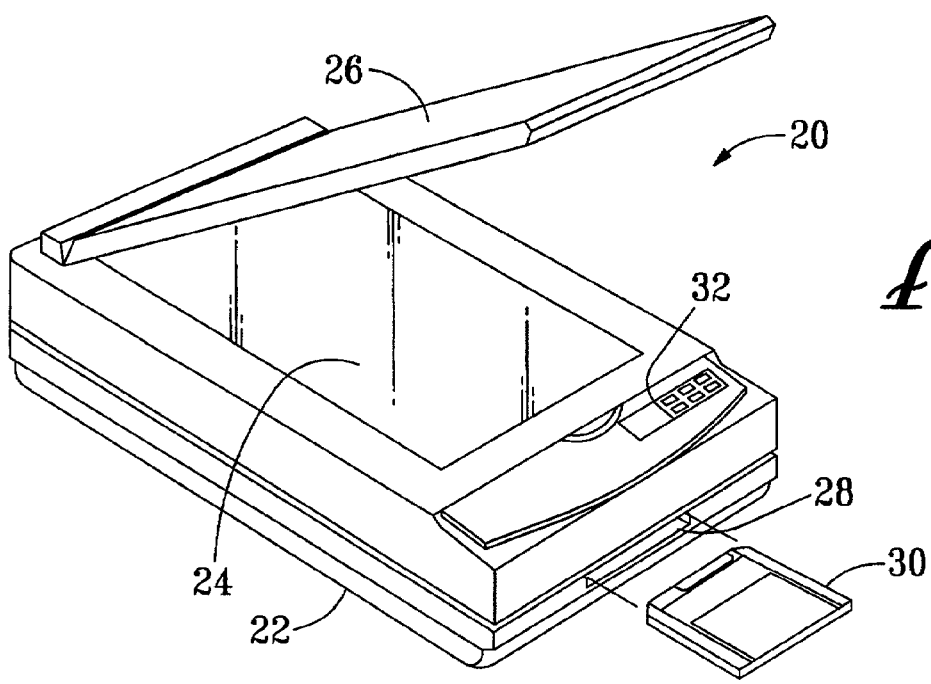
FIG. 1 is a perspective view of a first preferred embodiment of the present invention.

Referring to FIG. 1, a first preferred embodiment of the present invention is shown, including a conventional CCD-type flatbed scanner 20, housing 22, glass platen 24 and hinged lid 26. Also shown at 28 is a disk drive into which a conventional 3.5 inch floppy diskette 30 may be inserted for storage of digital data generated during the scanning process. Also shown on the scanner housing is control panel 32, which will be described in greater detail in conjunction with FIGS. 3 and 4.

Figure 2:
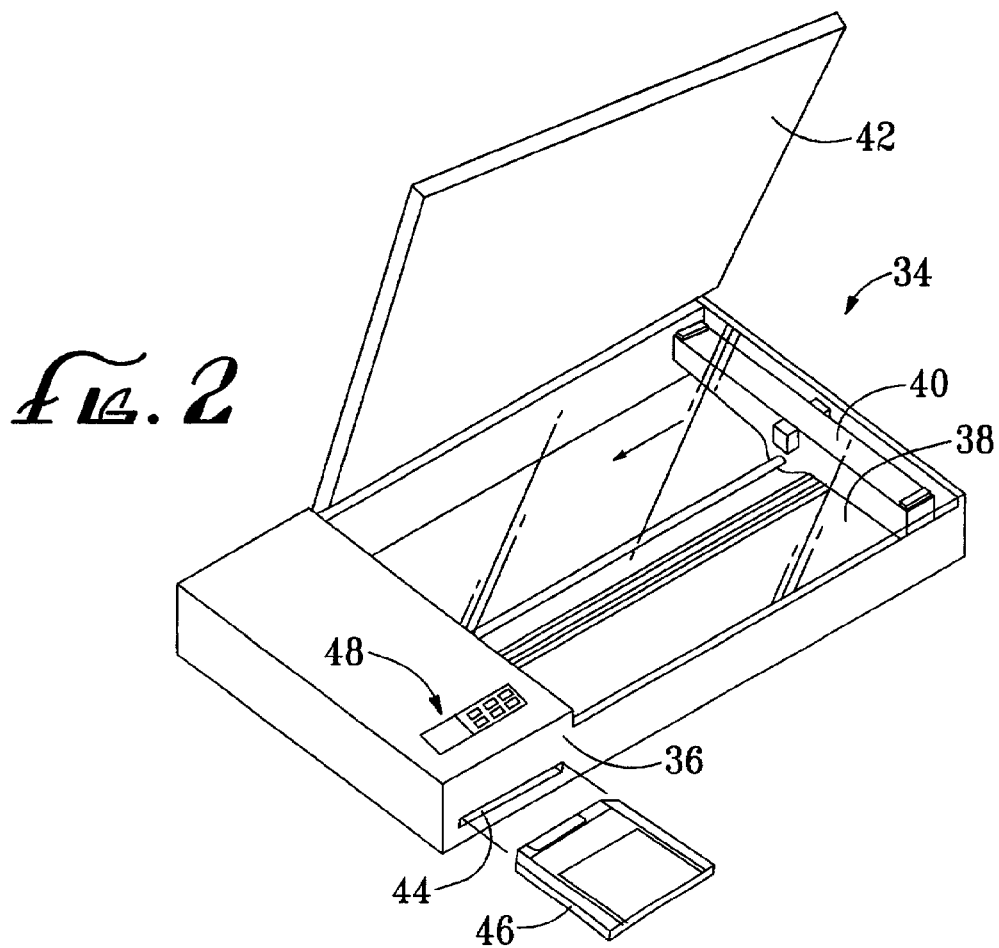
FIG. 2 is a perspective view of a second preferred embodiment of the present invention.

Referring to FIG. 2, a second preferred embodiment of the invention is shown adapted for use in a CIS-type scanner 34. The scanner 34 includes a housing 36, glass platen 38, hinged cover 42, and a CIS scanner positioned on a carriage 40. A CIS scanner of this type is described in commonly owned U.S. Pat. No. 5,907,413, incorporated by reference as if set forth fully herein. Housing 36 also incorporates a conventional disk drive, such as a disk drive 44 for a conventional 3.5 inch floppy disk 46.

Figure 3:
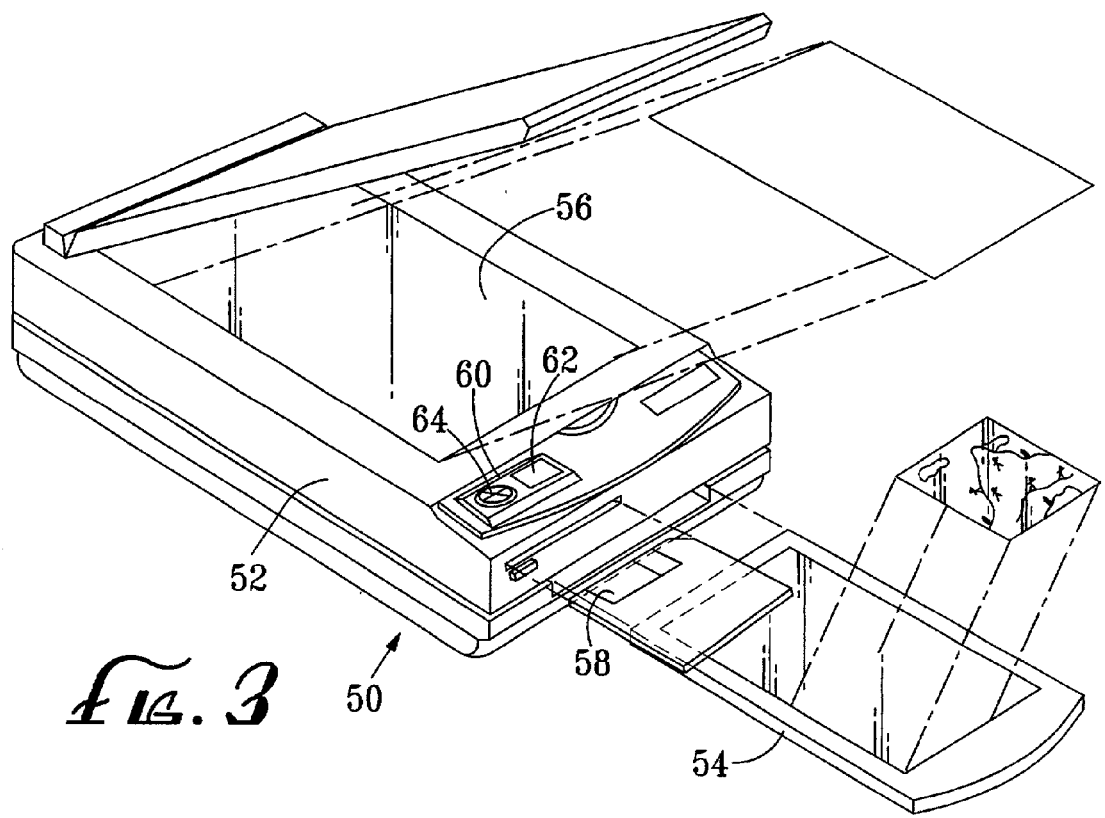
FIG. 3 is a perspective view of a third preferred embodiment of the present invention.

Referring to FIG. 3, a third preferred embodiment is shown, including a conventional transmissive/reflective type scanner 50, a housing 52, reflective scanning platen 56 and a transparency holder 54. This type of transmissive/reflective scanner is of the type disclosed in commonly owned U.S. Pat. No. 5,705,805, entitled Transmissive/Reflective Optical Scanning Apparatus; commonly owned U.S. Pat. No. 5,814,809 entitled Transmissive/Reflective Optical Scanning Apparatus and in commonly owned U.S. Pat. No. 5,574,274. Referring to FIG. 3, scanner 50 also incorporates a conventional disk drive into which a removable conventional, preferably, formatted, 3.5 inch floppy diskette 58 may be used for purposes of the present invention. The housing 52 includes a control panel 60 which includes a liquid crystal display 62 ("LCD") and a multi-function control button 64.

Figure 4:
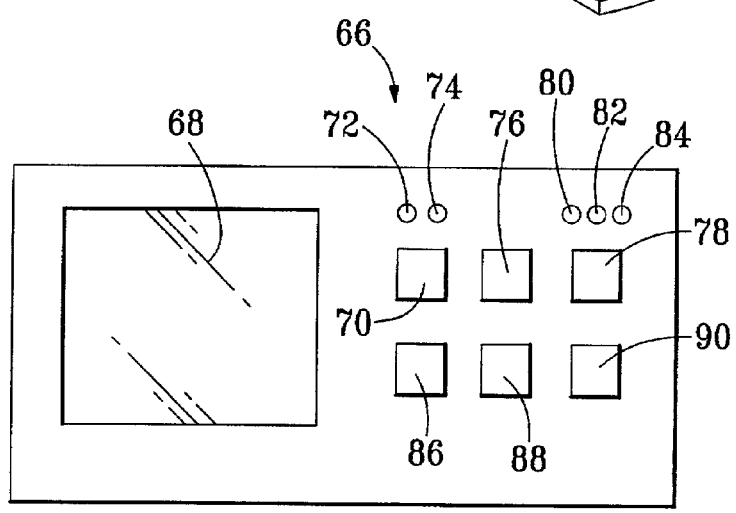
FIG. 4 is a plan view of a first alternate preferred control panel for the present invention.

Referring to FIG. 4, an alternate control panel 66 is shown having LCD display 68 and a plurality of control buttons. Control button 70 controls the mode of operation, either color, or black and white, with the light emitting diode ("LED") 72, when energized indicating the color mode of operation. The black and white mode of operation is indicated when LED 74 energized. Control button 78 controls the resolution of the scanner, with a high, low and medium resolutions preferred. LED's 80, 82 and 84 indicate whether the selected resolution is high, low or medium, respectively. Control button 86 is for controlling whether the LCD display is "on" or "off", the "on" being indicated simply by having an image on the display 68, and "off" being indicated by an absence of a display. Control button 88 is the erase control button, in which case an image stored in the disk drive may be erased. Control button 76 controls advance of the image displayed to the next image stored in the media. Button 90 controls the data compression of raw data.

Alternatively, and as shown in FIG. 3, the alternate control panel 60, control panel includes a multi-function control button 64 with "left", "right", "up", "down", and "enter" control functions, as is conventional. With such a multi-function control button 64, the various operational control choices are displayed as a series of menus on the LCD 62, with a cursor or pointer being controlled by operator movement of the multi-function button.

Referring to FIGS. 1 through 4 above, the present invention scanner provides for either reflective or transmissive scanning, and flatbed or handheld scanning, as is conventional and, at various resolutions, as also is conventional. However, the present invention also provides for transfer of the digital data representative of each scanned image directly to a portable memory positioned in the scanner itself. Alternatively, of course, an alternate transfer path may be incorporated into the scanner whereby digital data may be transferred directly to a computer, as is found in conventional scanners of this type.

Preferably the portable memory incorporated into a scanner of the present invention is a 3.5 inch floppy diskette, as is well known. Also, the present invention may be used in conjunction with other types of conventional data storage media, such as a flash memory card (also known as a PCMCIA card); a 100 MB Zip-Drive; a 120 MB, 3.5-inch diskette using a 120 MB, 3.5-inch disk drive available from O.R. Technology, Campbell, Calif., as its model FD-3120A (drive has industry standard ATAPI IDE interface); and also may be adapted to use a compact disk (CD) with write capability. The conventional 3.5 inch floppy diskette holds approximately 1.44 megabytes of data, which is equivalent to approximately 30 to 40 images, after compression, for a standard resolution, color VGA, 640×480 pixel image.

With respect to a standard or normal resolution for flatbed scanners of the general type described herein, a 300 dots per inch ("dpi") resolution is typical. At this resolution, using a color mode of operation, it is expected that a conventional 3.5 inch floppy diskette would store approximately 10 to 12 images wherein the object is of a standard letter size, i.e., 8½×11 inches, with presently available data compression technology.

Also, as will be appreciated, incorporation of a portable storage media such as a floppy diskette, etc., will require adaptations to the scanner such as provision for a battery and AC power supply to the memory device. With respect to the different types of portable storage media, a 3.5 inch floppy disk is most preferred, with a Zip-Drive, holding approximately 100 megabytes of data, being also preferred.

Figure 5:
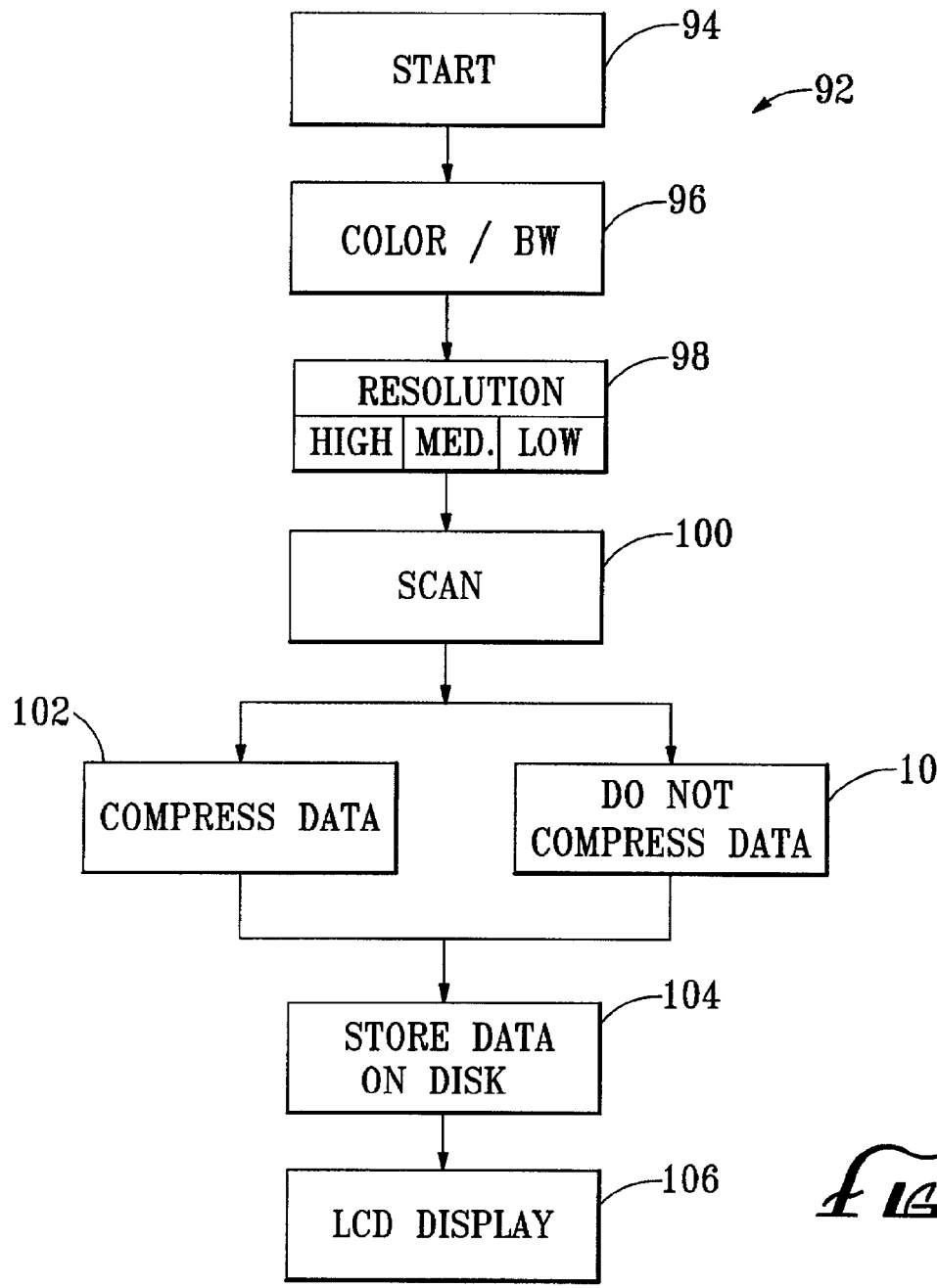
FIG. 5 is a flow chart illustrating programming steps for use of the present invention.
Figure 6:
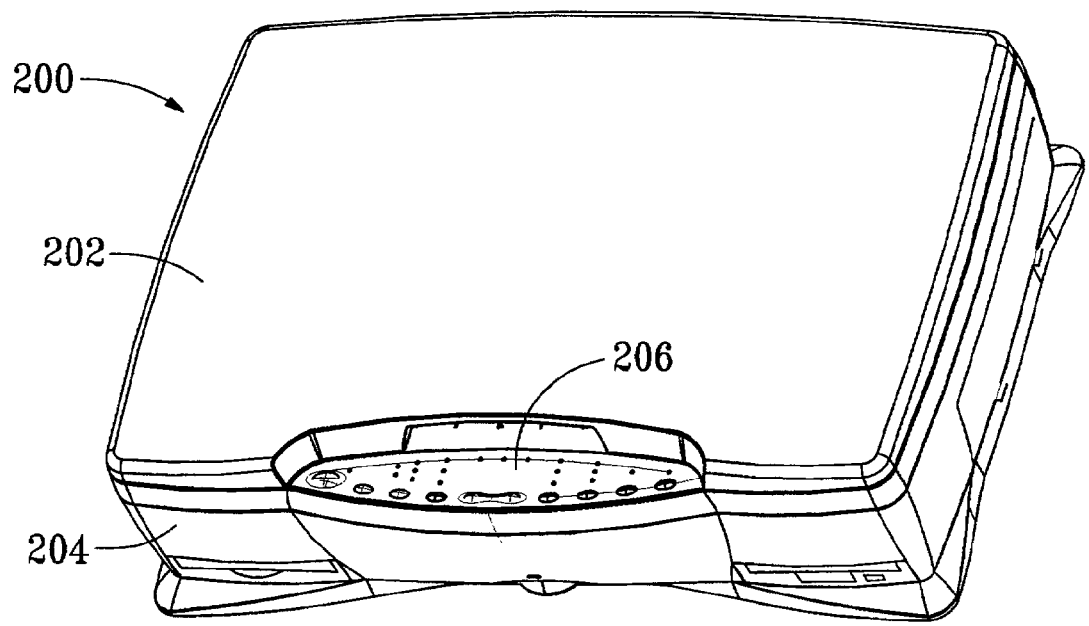
FIG. 6 is a perspective view of a fourth preferred embodiment of the present invention.

Referring to FIG. 5, a flow chart of programming steps for controlling the data collection, display and storage features of the invention will be described. Each of the blocks in the block diagram represent a programming step, or a series of programming steps which are available as conventional software, and/or readily generated using conventional programming techniques. Control routine 92 begins by starting the function at step 94 at the conventional on/off power button, not illustrated in FIG. 4. Once the system is energized, the mode of operation is selected at step 96, being either a color or black and white mode of operation. As shown in FIG. 4, control step 96 is selected with button 70, and LED 72 indicating a color mode of operation and LED 74 indicating a black and white mode of operation. Once the mode of operation is selected, the degree of resolution is selected, at step 98. Corresponding control button 78, with high 80, medium 82 and low 84 resolution LEDs also shown on the front of the control panel in FIG. 4. With conventional scanners, the medium resolution is typically 300 dpi, a high resolution is typically 600 dpi, with as high as 1200 dpi. For scanner operation, a low resolution is typically approximately 100 dpi.

Once the resolution has been selected, the scanning function is begun, at step 100, during which the carriage is advanced across the length dimension of the scanner to scan the object image and, through a CCD or CIS camera the object image is converted into digital data representative of the object image. Referring to FIG. 4, the scan or advance control button is shown at 76. Once the data has been scanned, data may be compressed, in step 102, using a conventional data compression routine, such as JPEG, or the equivalent. It is within the scope of the present invention that a single, predetermined data compression routine may be incorporated into the computer software application program controlling the operation of the scanner, or that several data compression options may be available, with further control options made available at the control panel (not shown) for selecting a particular data compression technique. Once the data has been compressed, it is then stored on the removable digital data storage media, step 104 indicating being stored on disk. Alternatively, no data compression is also an option, step 103. Data Compression is controlled by button 90, as shown on FIG. 4. Once the data has been stored on the disk, it may also be displayed on the LCD display, step 106, corresponding to display 62 (FIG. 3) or display 68 shown at FIG. 4. The stored data may be erased as described above in conjunction with control button 88.

Figure 7:
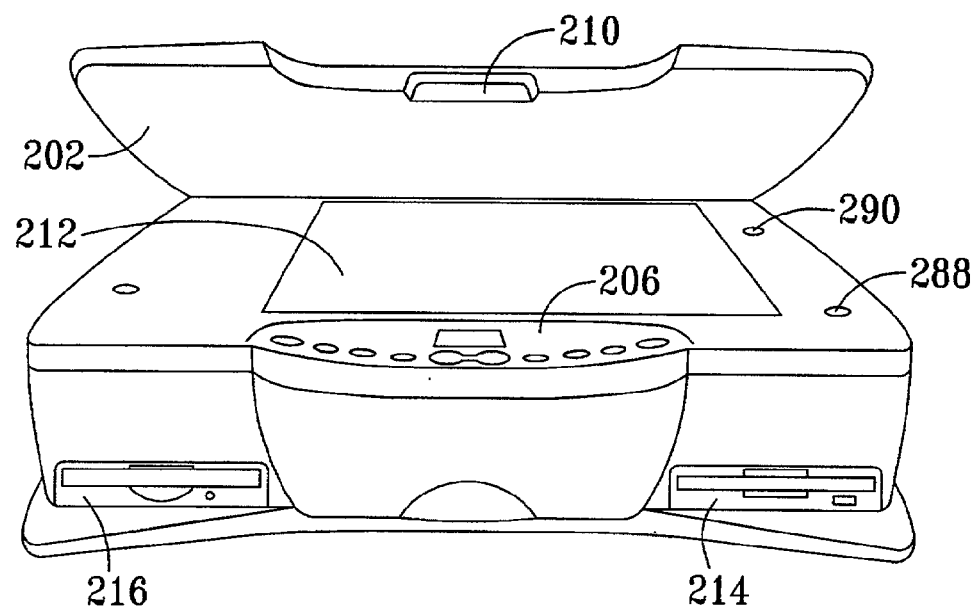
FIG. 7 is a front perspective view of the fourth preferred embodiment of the present invention with the cover in a partially open position.

Referring to FIGS. 6–9, a fourth preferred embodiment 200 of the present invention is a conventional flat bed scanner that incorporates a personal computer (PC) central processing unit (CPU) underneath the scanner platen and adapted to control conventional scanning, editing, input and output functions. The PC CPU is not shown in FIGS. 6–9, but can be conveniently positioned within the housing of the scanner, preferably underneath the platen of the scanner. The scanner 200 includes a top cover 202 and a housing 204. The front of the scanner includes a control panel 206 which is preferably flush with the level of the scanner which includes the platen. The shape, style and overall external configuration of the scanner may take many forms, one preferable form of which is illustrated in FIGS. 6–9. Referring to FIG. 7, the scanner 200 is shown with its cover 202 in a partially raised position, exposing a recess 210 that is configured and adapted for use as a handle to raise and lower the cover. The top surface of the scanner housing includes a scanning bed 212 having a conventional glass platen. The front of the scanner includes a conventional 3.5" floppy disk drive 214 and a conventional 100 MB drive 216, commonly referred to as a "Zip®" brand drive. Both of these drives are operatively connected to the CPU in a conventional fashion.

Figure 8:
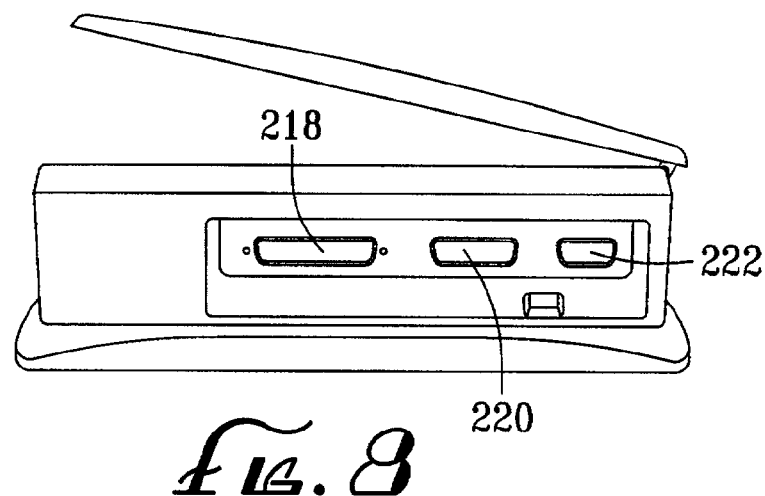
FIG. 8 is a first side view of the fourth preferred embodiment of the present invention with the cover partially open.

Referring to FIG. 8, this preferred embodiment also, preferably includes a conventional share port 218, a conventional printer point 220 and a conventional accessory port 222 for use, optionally, for peripherals such as a document feeder.

Figure 9:
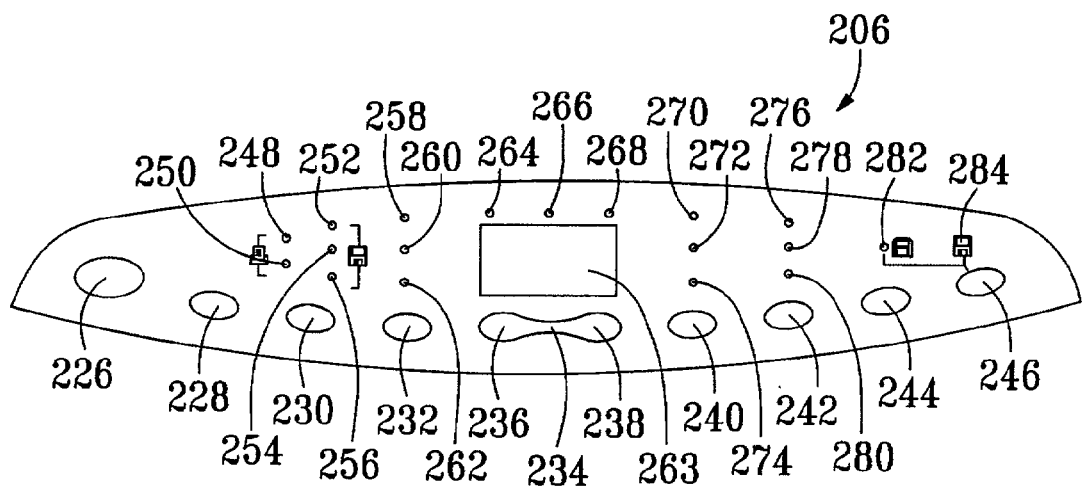
FIG. 9 is an enlarged top view of the control panel of the fourth preferred embodiment of the present invention.

With reference to FIG. 9, the control panel 206 includes controls and indicators for numerous functions used during operation of the scanner. Start button 226 initiates the selected operation, such as scan, or copy, both of which are conventional functions in scanners, as is well known. Stop/clear button 228 controls and permits the current scanner function to be stopped during operation. This function is used for printer set up operations and to return any settings back to default values. Also, pressing and holding the stop/clear button 228, preferably for 5 seconds, will reset a conventional file name counter. Mode button 230 functions to toggle between copying images to a connected printer, which may be either black and white or color, and scanning to a floppy or Zip® disk, which may be black and white, gray scale or color. The desired operation is selected, preferably, by pressing the mode button repeatedly to cycle through the various options. Compression button 232 functions to choose the amount of file compression desired for the scanned image. The options included, preferably, are low, medium and high compression. Conventional compression techniques are used in the present invention. As is well known, lower compression results in a larger file size but provides better image quality. In the preferred embodiment, compression setting is not available for the copy function or when scanning in a black and white mode. The control panel also includes the +/− button 234, with the − function illustrated at 236 and the + function illustrated at 238. These buttons function to specify the number of pages to be printed, when the scanner is in the copy mode of operation. When the scanner is in scan mode, these buttons function to increase or decrease the resolution level. Also, when the mode button 230 is pressed and held for at least 5 seconds, preferably, and with the printer mode selection selected, the +/− buttons 234, 236 and 238 function to choose a printer mode number that corresponds to a printer model. Various printer models are supported, as desired, with the present invention.

Resolution control button 240 functions to choose the level of detail desired for a particular image to be scanned. The resolution is increased by using the + button 238 and decreased by pressing the − button 236. The preferred resolution settings for the scan function, in dots per inch, for the default settings for low, medium and high resolution are as follows:

In black and white mode: 150, 300 and 600
In gray scale: 75, 150 and 300.
In color: 75, 150 and 300.

In the copy function the resolution settings, in dots per inch, the default settings for low, medium and high resolution are as follows:

In black and white: 300, 450 and 600.
In color mode: 100, 150 and 300.

In this preferred embodiment of the present invention, the settings shown on the LED display panel during the copy mode refer not to the resolution setting itself but rather to the number of copies to be printed.

Scan area selection button 242 functions to choose the maximum size that can be scanned by the scanner. In the present invention, the preferred sizes are A4, which is 8.5" by 11.7"; and letter, which 8.5" by 11" and "auto". Auto refers to enablement of an automatic edge detection system, which is conventional. In this mode, the scanner will complete an initial pass to find the edges of the photo or document and then scan only the detected area. When using this mode, it is preferable to keep the lid closed.

The document function button 244 functions to automatically set preferred defaults for quickly scanning a text document. In the present invention, the preferred default settings are B/W for the scan mode. Although in this mode color documents may be scanned, the resulting output would be black and white. The default resolution is 300 dpi, the scan area is letter size and no compression is performed. After the document button is pressed to select the default settings, individual settings may be altered as desired, and then scanning may be started by pressing the start button 226.

The "save to" button 246 functions to select whether the scanned images are saved to a Zip® disk or to a floppy disk. In the present invention, it is preferred that pressing and holding the "save to" button for at least 5 seconds will cause the CPU to attempt to format the floppy disk into an IBM-compatible formatted disk. This function will erase all files on the disk unless it is write protected. Various file formats may be used, but in the present invention the PCX file format is preferred for files scanned in black and white mode, and Jpeg file format is preferred for files scanned in the color mode.

Also, preferably, saved files are assigned numeric file names in sequence, starting from img01.pcx or img01.jpg, repeating after img99. Preferably, the counter may be reset back to img01 by pressing and holding the stop/clear button 228 for at least 5 seconds. In this case the LED display will show "F1" to indicate that the counter has been reset to indicate file number "1".

Although the present invention could use an internal clock, the preferred embodiment does not and all saved files are date stamped as Jan. 1, 1999.

Various indicator lights and labels may also be used on the control panel 206. For example, in the preferred embodiment, indicator lights 248 and 250 indicate B/W and Color, respectively in the copy mode. Indicator lights 252, 254 and 256 indicate B/W, Gray and Color, respectively in the scan mode. Indicator lights 258, 260 and 262 indicate high compression, medium compression and low compression, respectively.

Above the LED 263 display, indicator lights 264, 266 and 268 indicate an unformatted disk, a full disk and no disk, respectively. Above, the resolution button 240, indicator lights 270, 272 and 274 indicate high resolution, medium resolution and low resolution, respectively. Above the scan area control button 242, indicator lights 276, 278 and 280 indicate A4, letter and auto sizes respectively. Above the "save to" control button 246 the indicator lights 282 and 284 indicate selection of the Zip® drive or diskette, respectively.

This fourth preferred embodiment of the present invention is a 36-bit, stand-alone scanning appliance with scan, copy, image-saving, image-compression and disk-formatting capabilities combined into a single scanner. This preferred embodiment is a stand-alone scanner which means that there is no need to connect the scanner to a computer. Rather, once power is supplied to the scanner, it is ready to scan and copy, save and perform its other functions. Because it is a stand alone scanning device, it comes with its own file saving features built in. The Iomega brand Zip® drive accommodates a standard 100-MB, IBM-compatible, formatted Iomega Zip® disk and also includes a standard floppy drive that accommodates conventional 3.5" floppy disks. This preferred embodiment includes 600×600 dpi optical resolution and scans in color, gray scale and black and white modes. Also, preferably, it is adapted for and may include conventional image editing, document management, and OCR software for scanning photos and documents, thus making the entire scanning process simple and convenient.

Typical optional uses for the present invention would include the scanner to scan images and then send the scanned images to a printer. In this configuration, a standard printer cable from the printer's parallel port is preferably connected to the present invention's printer port 220. Then, the "mode" control button 252 is held for at least 5 seconds, and the +/− keys are operated to choose the printer mode number corresponding to the printer model that is connected. The start button is then pressed to save the printer mode number into the computer's CPU memory and set up is complete.

In an alternate mode of operation, the same printer may be shared with a PC and the scanner of the present invention. In this application two standard parallel printer cables are used, with one cable connected from the printer to the printer port 220 and the second printer cable connected from the PC's parallel port to the "share port" 218 shown in FIG. 8. During operation in this mode, the scanner of the present invention must be turned "on".

In yet another mode of operation, the scanner of the present invention may be configured to work with Microtek brand, standard 10-page auto document feeder, such as model ADF-600L, for simplified multi-page document scanning. In this mode of operation, the upper lid 210 is removed by raising it up 90° and lifting it straight up. Then the metal posts of the ADF are inserted into the holes on the right side of the scanning bed, shown at 288 and 290 in FIG. 7. The ADF is then plugged into the accessory port 222 in the scanner, and is ready for automatic document feed mode.

The present invention also includes numerous conventional warning indicators that are displayed on the LED display panel. Detection processing and display of these indicators are conventional, and may include messages such as "write-protected disk", "no-disk", "disk full", "disk not formatted", "warm up" and so forth, as is conventional.

Described below are several operations of the present invention.

Scan and Save a Color Photo

In this operation, a color photo is scanned and saved to a floppy disk in a format suitable for on-screen display. The steps, including operator steps and steps performed by the CPU scanner are as follows:

1. Turn the scanner on.
2. Place the photo to be scanned face down on the scanner glass, and close the scanner lid.

3. Press the mode button 230 repeatedly until the green LED light goes on in the scan section of the panel and then choose "color".
4. Insert a 3.5" IBM-compatible formatted disk into the floppy drive 214.
5. Press the "save to" button 246 to select "floppy".
6. Set the resolution button 240 to "low" (75 dpi) and set the compression control button 232 to "high" to create the smallest file size.
7. Press the scan area button 242 repeatedly until "auto" is selected.
8. To start scanning, press start button 226. The image will then be scanned and saved to the diskette, with the file format such as img01.jpg. The document can then be opened for viewing in an image-editing software program on the computer with conventional image-editing software such as Ulead® PhotoImpact brand software.

Scan and Save a Test Document

In this mode of operation, a printed page of text is scanned and then saved to a floppy disk in the format suitable for OCR (optical character recognition) text processing. The steps are as follows:
1. Turn the scanner on.
2. Place the document face down on the scanner platen 212 with the top of the page on the left side of the scan bed and close the scanner lid.
3. Press the document control button 244 to set default values for various settings.
4. Insert a 3.5"0 IBM-compatible, formatted disk into the floppy drive 214.
5. Press the start button 226 to begin scanning and saving the document. It will be saved with a file name such as img01.pcx. The file can later be opened for OCR processing in conventional software such as Caere PageKeeper Standard or Caere Omni Page Limited Edition.

Copy (Print) an Image to the Printer

In the copy/print an image to the printer mode of operation, a photograph is copied by printing it on a color printer. The printer must be properly connected to the scanner and the correct printer mode must be selected on the scanner. The steps for performing this operation are as follows:
1. Turn the scanner on.
2. Place the photo face down on the scanner platen 212, and close the scanner lid 202.
3. Press the mode control button 230 repeatedly until the green LED light goes on in the scan section on the panel and choose "color".
4. Press the resolution button 240 and choose "low".
5. Press the scan area button 242 and choose "auto".
6. Press the "+" or the "−" button to indicate the number of copies to be printed.
7. Press the start button 226. The image is then scanned and sent as a copy to the printer.

Fifth Preferred Embodiment

Figure 10:
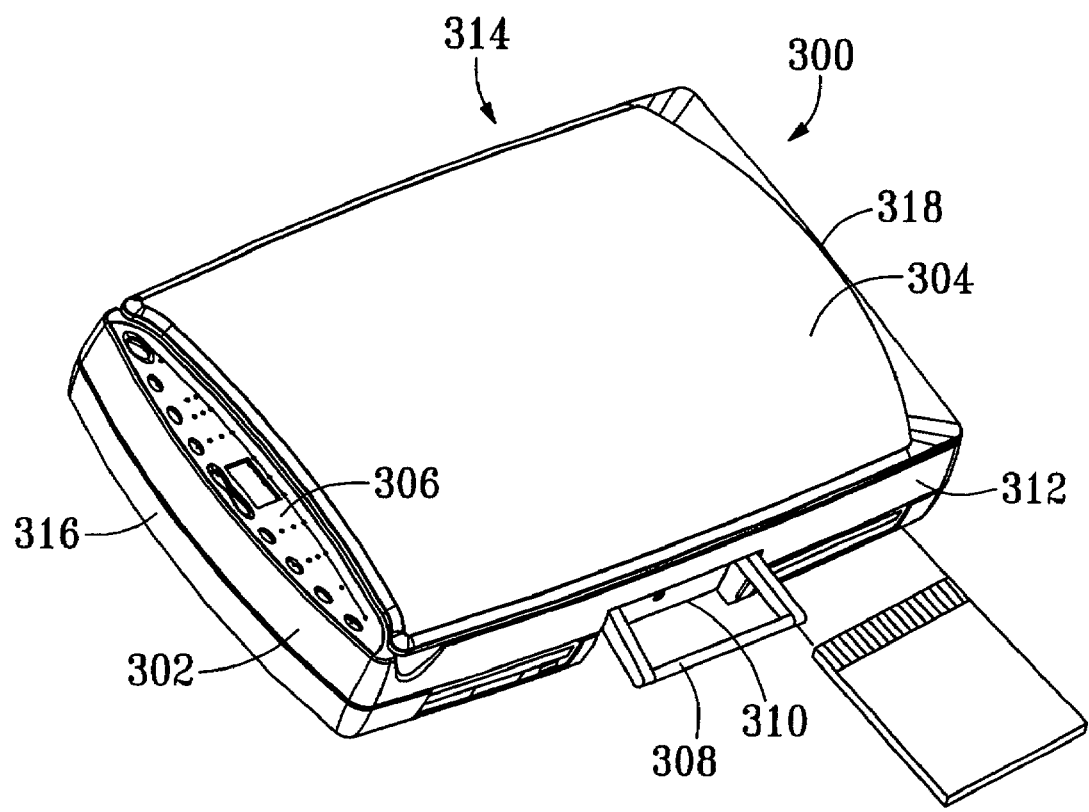
FIG. 10 is a perspective view of the fifth preferred embodiment of the present invention.
Figure 11:
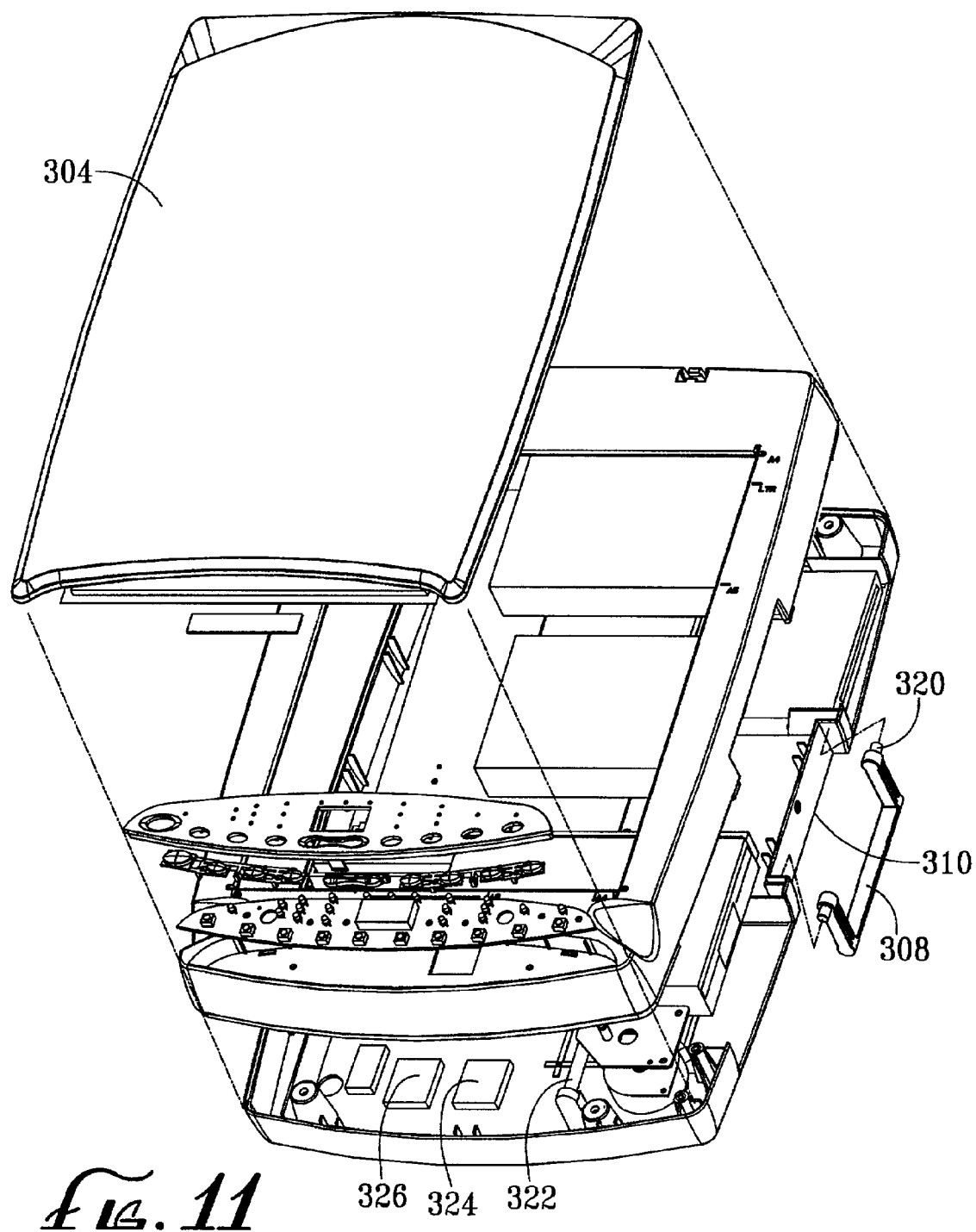
FIG. 11 is an exploded perspective view of the fifth preferred embodiment of the present invention.
Figure 12:
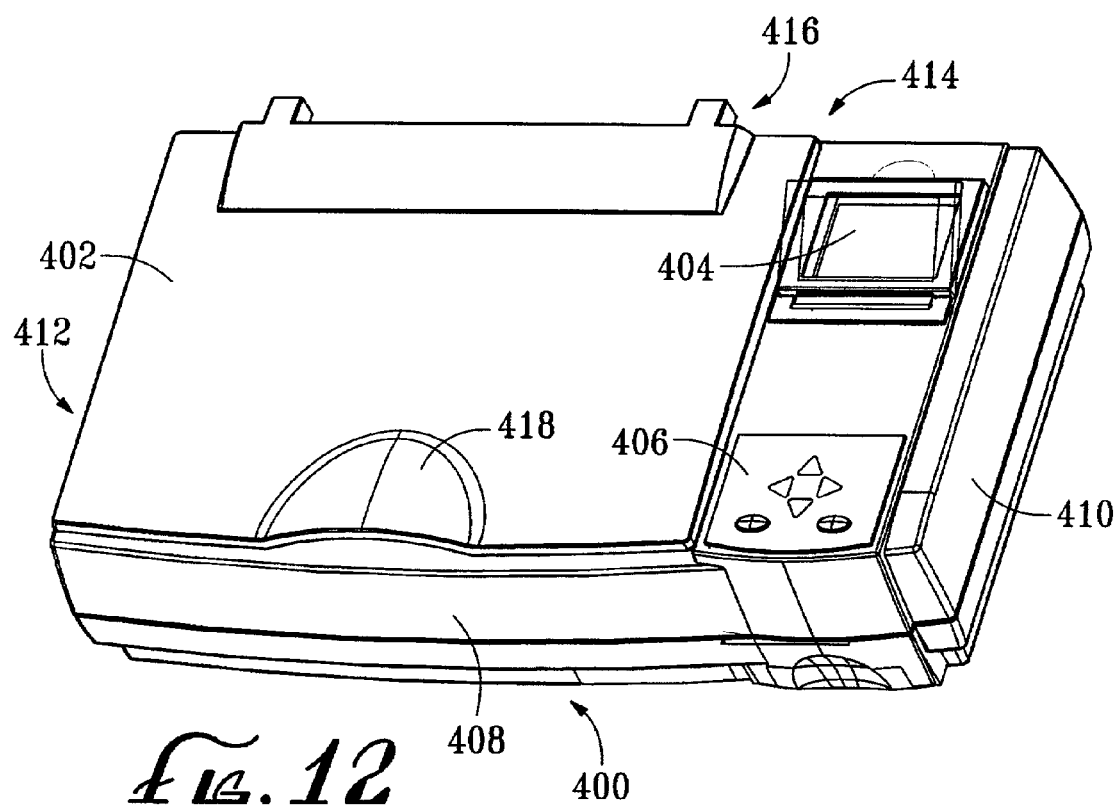
FIG. 12 is a top perspective view of the sixth preferred embodiment of the present invention.

With reference to FIGS. 10–11, a fifth preferred embodiment 300 of the present invention will be described. The fifth preferred embodiment also includes, internally, a CPU and is similar in many respects to the fourth preferred embodiment described above, except that the fifth preferred embodiment is adapted to be portable; employs a contact image sensor (CIS) rather than a charged coupled device (CCD) sensor; includes additional memory; and/or is configured to display directly to a TV or VGA monitor.

The scanner 300 includes a housing 302, a lid 304 and a control panel 306. The lid is hinged and the control panel is similar in appearance and function to that as described above with respect to the fourth preferred embodiment. The housing 302 includes provision for a floppy disk as well as a Zip® drive, although only one of these could be employed in a specific commercial embodiment. The housing 302 also includes a handle 308 which is pivotally fastened to the housing and when not in use, is pivoted to lie within recess 310 which is shown in FIG. 10. The fifth preferred embodiment also includes a memory module within its control circuitry, with preferably either a 4 Meg or 8 Meg capacity, neither of which are shown but both of which are conventional.

Also, the scanner 300 is configured and adapted to display directly to a VGA monitor using conventional firmware and, also, is configured to output for display on a TV screen. In this later configuration, conventional CyberPro 2010 firmware available from IGS Technologies is preferably used. Also, the fifth preferred embodiment may include a controller for use with the TV.

Referring to FIG. 10, the scanner 300 housing 302 includes a front side 316, a back side 318, a left side 314 and a right side 312. FIG. 11 is an exploded perspective view of the scanner 300 showing the lid 304, the intermediate panels, not numbered, and the pivotal handle 308, with one of the pivots illustrated at 320. The monorail for movement of the CIS module is also shown at 322. The CPU and memory module are illustrated at 324 and 326, respectively.

The fifth preferred embodiment also is adapted for and contains a conventional rechargeable battery, such as a Lithium so that it may used in situations when an external power supply is not available. The operation of the scanner 300 is similar to that as described above, with respect to the fourth preferred embodiment, except that the images may be displayed directly on a television screen.

Sixth Preferred Embodiment

With reference to FIGS. 12–25 a sixth preferred embodiment 400 will be described.

The fourth and fifth preferred embodiments of the present invention preferably use a CPU of the "486" type and employ DOS based operating systems. The sixth preferred embodiment preferably uses a Pentium type CPU and employs a Windows '98 operating system with network capability.

The sixth preferred embodiment includes 600 dpi×1200 dpi optical resolution using conventional scanning techniques. It is also networkable via the standard Ethernet connection. The scanner also includes 12"×17" reflective and a 9.5"×11.5" transparency scan frames. Optionally, a conventional transparent media adapter may be used with the sixth preferred embodiment. The scanner 400 also includes full 36-bit color depth capability, employs, preferably, a 250 MB Iomega® Zip® internal disk drive and a 1.4 MB internal disk drive. The scanner 400 also includes a 10 GB hard drive, preferably.

The sixth preferred embodiment is adapted for commercial quick copy, quick print operations, corporate offices, libraries, schools and other multiple user environments. It has a large, A 3 (12"×17") color scanning capability and LCD panel for quickly and easily stepping through a scanning process. The scanner 400 is adapted for rapid scanning by the novice of photos, illustrations or documents, relatively fast saving of files to Zip® cartridges, the scanner's own internal hard drive, or transmitting the files over a network to a specific work station for later use.

Figure 13:
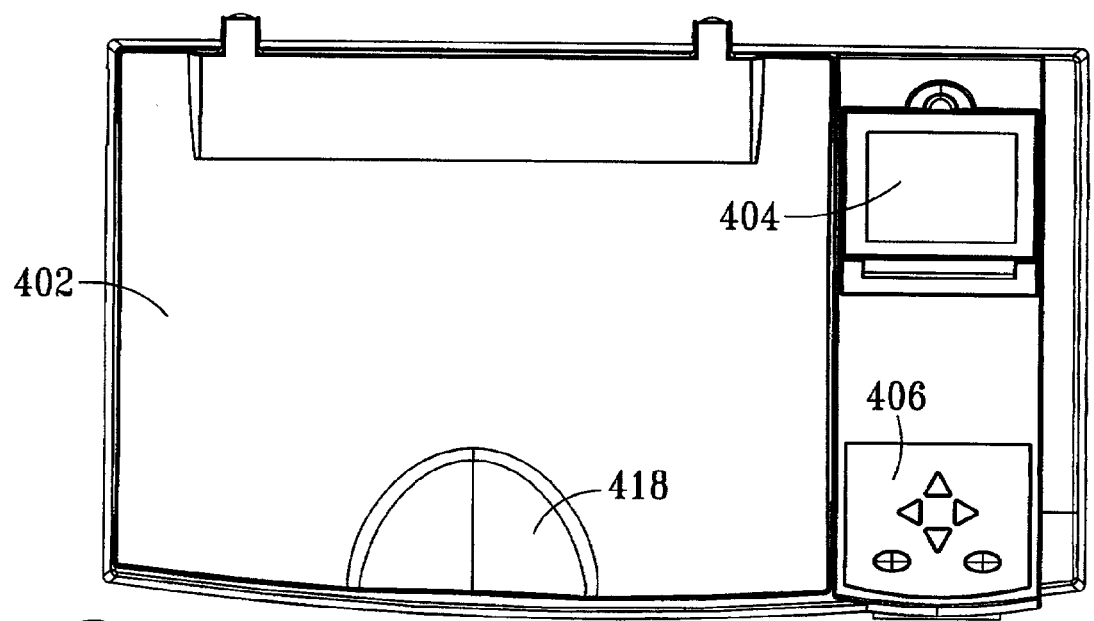
FIG. 13 is a top view of the sixth preferred embodiment of the present invention.
Figure 14:
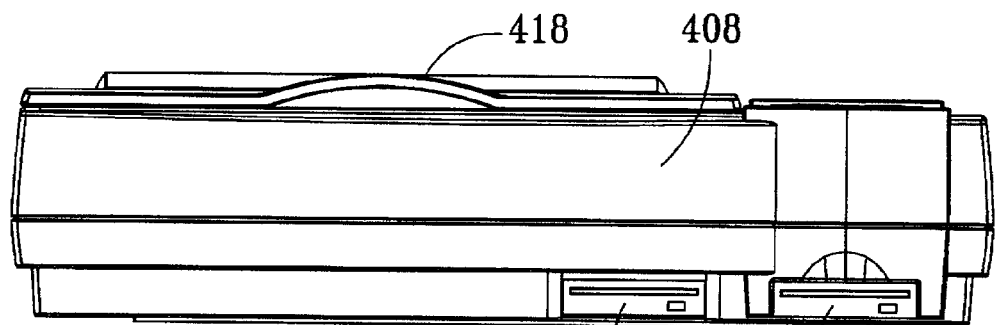
FIG. 14 is a front side view of the sixth preferred embodiment of the present invention.
Figure 15:
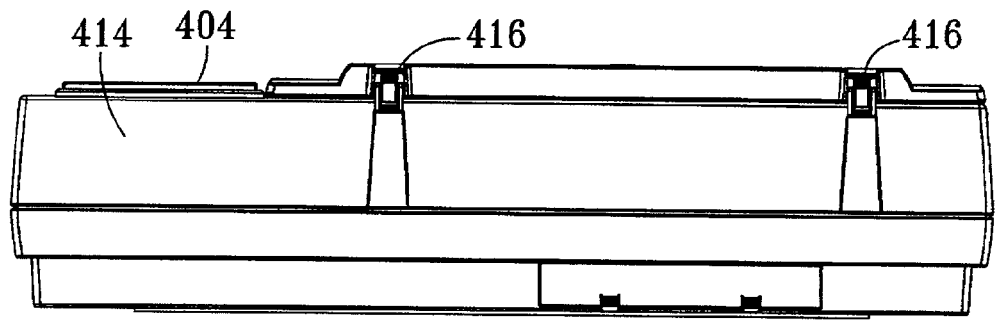
FIG. 15 is a rear view of the sixth preferred embodiment of the present invention.
Figure 16:
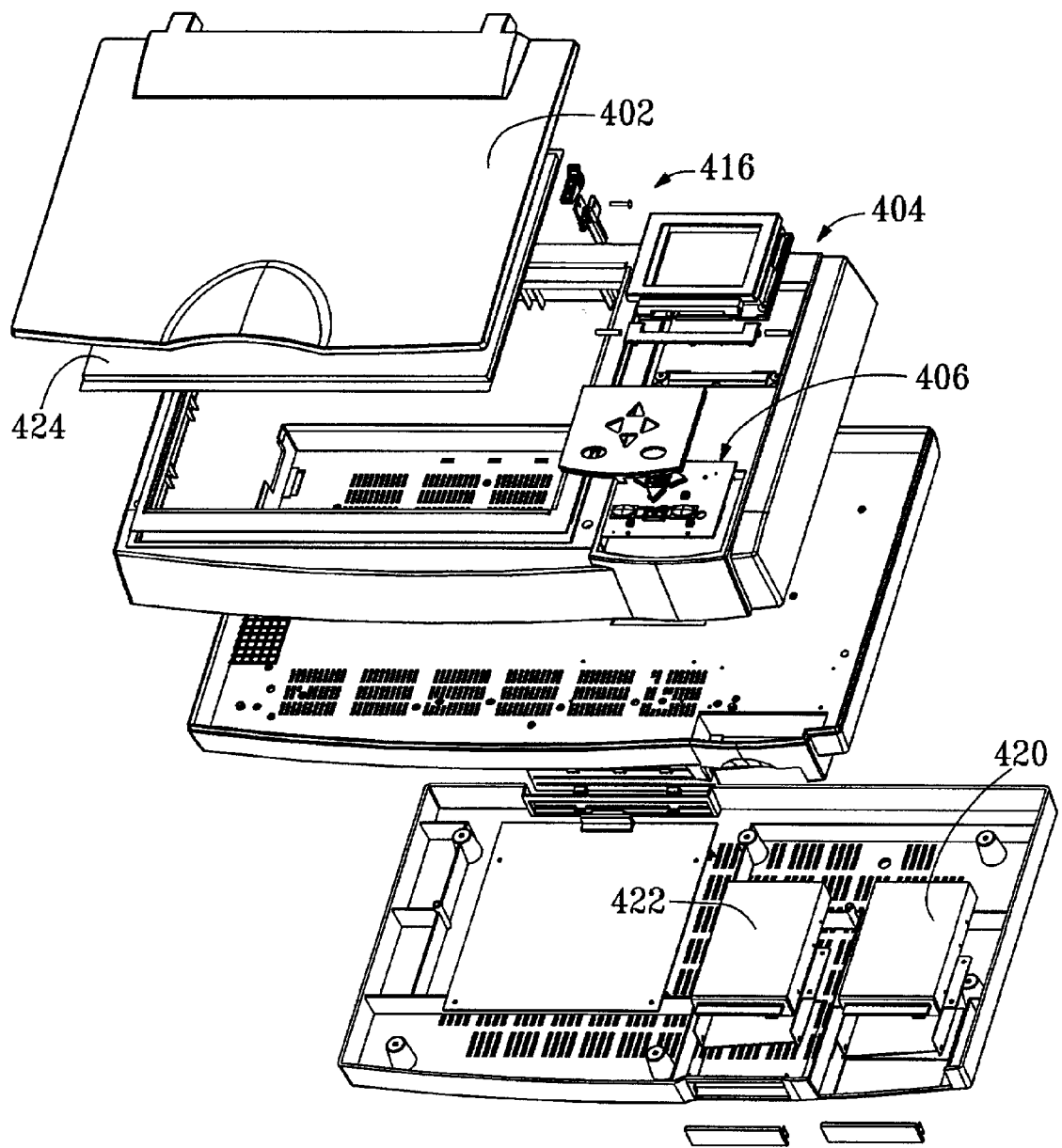
FIG. 16 is an exploded perspective view of the sixth preferred embodiment of the present invention.

The scanner 400 includes a lid 402, and a raised, arcuate handle 418 for raising the lid about the pivots, one of which is shown at 416. On the top of the housing a rotatable LCD display panel 404 is shown in the raised position. Conventional multi-function control panel 406 provides for controls, with corresponding instructions and indications provided on the screen of the LCD panel 404. The scanner 400 includes a front face 408, a right side 410, left side 412 and a back side 414. Referring to FIG. 13, the lid 402, handle 418, LCD panel 404 and control panel 406 are shown. In FIG. 14, the arcuate configuration of the handle 418 is illustrated and the front of the Zip® drive 420 and floppy drive 422 are also shown in front side 408. FIG. 15 illustrates the back side 414 and hinges 416 as well as the LCD panel 404, shown in a down position. FIG. 16 is an exploded perspective view of the scanner 400 including the lid 402, the hinges 416, the LCD panel 404, the control panel 406, the scanning surface 424, the Zip® drive 420 and floppy drive 422.

The scanner 400 is a conventional, single pass color flat bed scanner that supports reflective and transparent scanning of originals that size from 35 mm to 11½"×9½". The preferred sensor in the scanner is a conventional tri-linear RGB CCD, 8000 elements per array. The LCD display is a conventional 5" diagonal LCD display. The illumination for the scanning is preferably a cold cathode flourescent lamp. A conventional 5" diagonal LCD display is used for previewing and scanning and includes an 8-button navigational control panel, an Ethernet port, a keyboard port an additional VGA monitor, a TV monitor and an SCSI-2 port.

The bit depth, and color, is preferably 36-bit to optimize 24-bit and the gray scale is, preferably 12-bit to optimized 8-bit. Line art capability is 1-bit.

The preferred sample depth is 12 bits per color to 36 bits per color. The preferred dynamic range is RX:2.3 (D max) and TX:3.2 (D max).

It is estimated that the scanning time for a 4"×5" object, scanned at 600 dpi, is 50 seconds. The maximum interpolated resolution is about 9,600 dpi and the maximum optical resolution is about 600×1200 dpi. The scanner employs a universal power supply with auto switching capability and may be operated at the voltage of 95 to 254 VAC. The scanner will operate in frequency of 50 hertz to 60 hertz at 110/240 volts. The maximum estimated power consumption is 200 watts.

In operation, the sixth embodiment is a stand alone scanner which can be used by simply plugging it into a conventional external power supply. Scanning takes place in a fashion similar to that as described above with respect to alternate embodiment for, except, of course that the scanning and storage capacities are larger, and the control is through a different, conventional control system.

The images may be scanned and saved directly to the internal disk drive, the Iomega® Zip® cartridge, a conventional 3.5" floppy disk, or transmitted via the Ethernet port and connected to an office or commercial environment network. Because the scanner includes a CPU it is a standalone color scanning station with images saved in formats readable by Windows or Macintosh operating systems. When connected to a network the scanner operates like an image server, displaying recently scanned files for acquisition from any computer active on the network. Use of this scanner will free up other computers in the system otherwise tied up to scanning functions.

With the optional, conventional transparent media adapter, the sixth preferred embodiment is available for scanning film positives or negatives as large as 9.5"×11.5". Images may also be sent via e-mail over the network by use of a conventional, PC compatible keyboard. This scanner also features a conventional auto crop function which determines the location of the original to be scanned on the bed and the crops right to its edges. The 5-inch diagonal LCD display measures 4"×3".

Seventh Preferred Embodiment

With reference to FIGS. 17–22 a seventh preferred embodiment 500 will be described. In the seventh preferred embodiment, a stand alone scanner, of the type described above, having its own CPU, of type 486 or higher is used in a stand alone scanner 502. The scanner 502 has the capability for video output 504 to a television 506, as well as VGA or SVIDEO output 508. The VGA or SVIDEO output is directed to LCD projector 510, which in turn projects the scanned image onto screen 512.

In the seventh preferred embodiment, an infrared (IR) remote control 514 is used to control the scaling of the image projected on the screen 512 by use of a zoom out function 516 and/or zoom in function 518. Also, particular regions of the scanned image may be selected or centered, by using the left function 520, the up function 522, right function 524 and/or down function 526 controls on the IR remote control unit 514. The conventional enter function 528 and conventional escape function 530 may also be accessed via the IR remote control 514.

Figure 17:
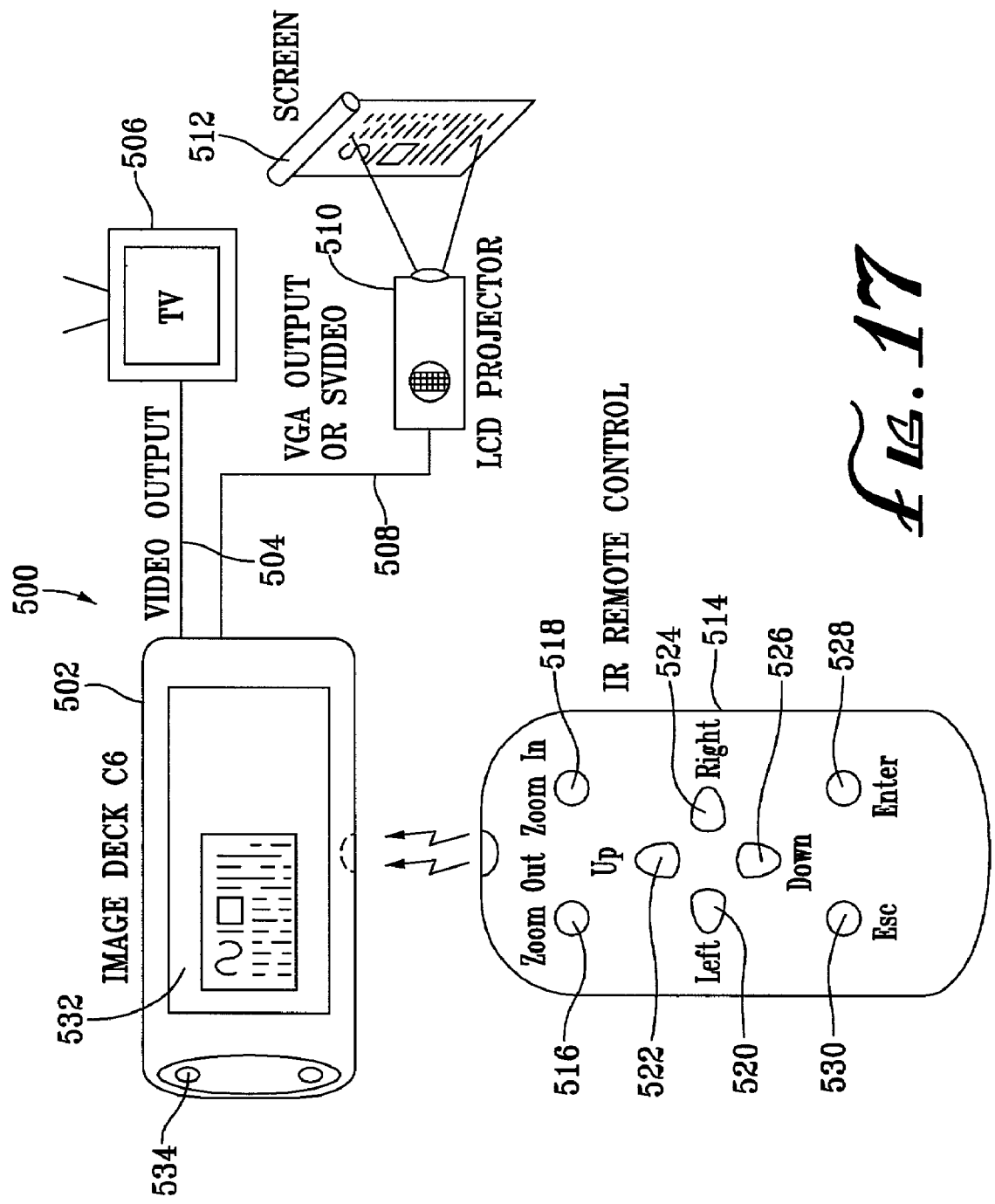
FIG. 17 is a schematic drawing of the seventh preferred embodiment of the present invention scanner projection system.

The scanner 502 schematically shown in FIG. 17 with an object to be scanned 532 is shown in FIG. 17. The scanner 502 also has a conventional start control 534. During operation, the seventh preferred embodiment includes placing the object to be scanned 532 on the glass platen, face down, pressing the start button 534. In the present invention, the start button 534 has been configured to enter a projection mode whereby the image scanned will be projected onto the screen 512 via LCD projector 510 via a VGA or SVIDEO output 508. Once the entire image has been shown on the screen 512, the various control features of the remote control unit 514 may be used to change the scale of the image displayed on the screen and/or to browse different areas of the image scanned from object 532.

Figure 18:
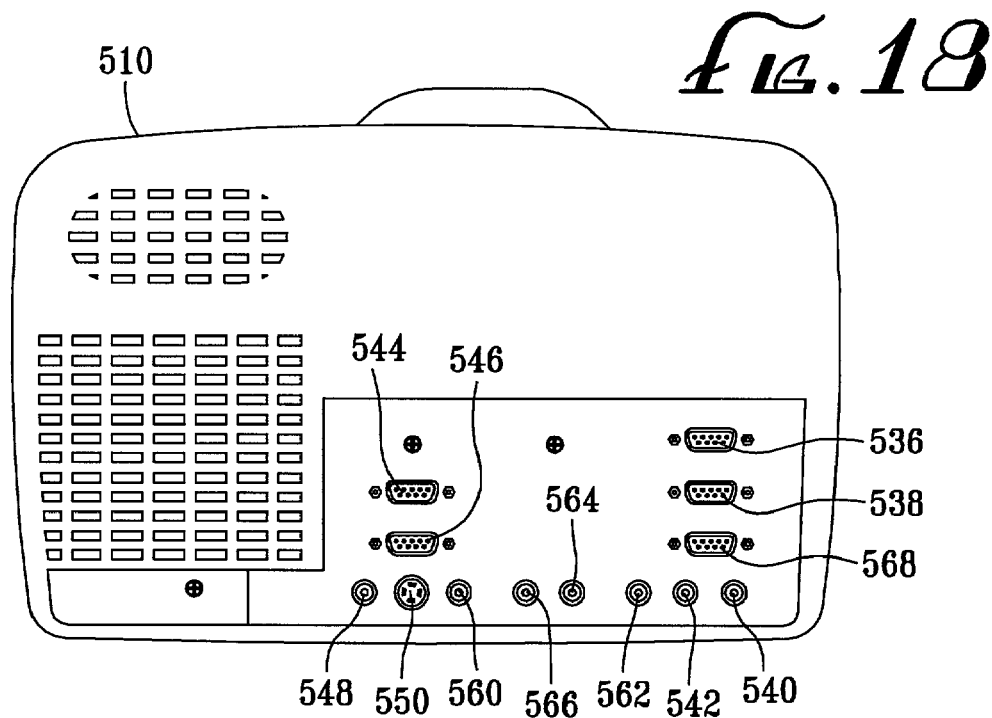
FIG. 18 is a rear view of a multimedia projector showing various inputs that may be used in conjunction with a scanner projection system of the present invention.

With reference to FIG. 18, a typical rear view of LCD projector 510 is shown with various inputs and outputs. Two inputs, 536, 538, preferably DB-15 connections, are shown for use with computers. Two inputs 540, 542, preferably many-stereo connections, are shown for use in inputting audio from a computer. Two inputs 544, 546, preferably windows only DB-9 connections, are shown for use in receiving input via serial input from a mouse type pointing device. Input 548 is shown for a composite video source, preferably an RCA type connection. Input 550 is shown as a S-VIDEO source, preferably a conventional S-VIDEO connection. Input 560 is shown as another audio input, preferably a mini-stereo connection.

Connections 562 and 564 are outputs for active, that is amplified, audio components, preferably mini-stereo connections. Connection 566 is an output for a video monitor, preferably an RCA type connection. Connection 568 is an output for a CRT or LCD monitor, preferably a DB-15 type connection.

The projector 510 is a conventional multimedia projector that includes a projection lens, remote control mouse sensor, power cord connectors and a master power (on/off). The projector also includes a conventional air filter, control panel, a zoom lens capability, the remote control mouse sensor, a projection lens, power cord connectors, carrying handle, and a lens cover. The main connection panel is located on the rear of the projector, preferably and is where a wide variety of computer, video and audio devices may be connected. Within the intention of the present invention, preferred multimedia projectors are the Microtek brand, model MVP 700s and/or the Microtek brand, model MVP 800x projectors. The performance characteristics and specifications of these two projectors are set forth below in tables 1 and 2.

TABLE 1

Microtek Brand MVP 700s Projector

| | |
|---|---|
| Resolution | True SVGA with compression for 1.024 × 768 (XGA) |
| Colors | 16.7 million |
| Display Type | Three 1.3" 800 × 600 Polysilicon LCDs |
| Image Size | 35–300"/89–762 cm. diagonal image |
| Video Compatibility | S-VIDEO, NTSC, PAL, SECAM |
| Data Compatibility | PC, Mac, XGA, SVGA, VGA |
| Anti-Keystoning | Built-in 8.5 degree keystone correction |
| Projection Lens | 1.35 × manual zoom and focus |
| Versatility | Front and rear |
| Loop-thru | Drives multiple projectors/External monitors |
| Audio | 2 built-in stereo speakers, 3 watt peak output each |
| Lamp | 150 watt UHE (Ultra High Efficiency) |
| EMI & Safety Certification | FCC-A, UL, C-Tick, cUL, CE/TUV, CNS |
| Lamp Life | 2,000 hour life (average) |
| Dimensions | 8" (197 mm.) Tall × 10" (257 mm.) Wide × 14" (360 mm.) Deep |
| Weight | 14.9 lbs/6.7 kg. |
| Power Requirements | 100–240 V, 50–60 Hz., autoranging, power loop-thru |
| Environment | Temperature: Operation: 5° C., 41° F.–97° F. Storage: –10° C. to 60° C., 14° F.–140° F. Humidity: Operation: 20% to 80% Storage: 20% to 80% |

TABLE 2

Microtek Brand MVP 800x Projector

| | |
|---|---|
| Resolution | True XGA with compression for 1.280 × 1.024 (SXGA) |
| Colors | 16.7 million |
| Display Type | Three 1.3" 1.024 × 768 Polysilicon LCDs |
| Image Size | 35–300"/89–762 cm. diagonal image |
| Video Compatibility | S-VIDEO, NTSC, PAL, SECAM |
| Data Compatibility | PC, Mac, SXGA, XGA, SVGA, VGA |
| Anti-Keystoning | Built-in 8.5 degree keystone correction |
| Projection Lens | 1.35 × manual zoom and focus |
| Versatility | Front and rear |
| Loop-thru | Drives multiple projectors/External monitors |
| Audio | 2 built-in stereo speakers, 3 watt peak output each |
| Lamp | 150 watt UHE (Ultra High Efficiency) |
| EMI & Safety Certification | FCC-A, UL, C-Tick, cUL, CE/TUV, CNS |
| Lamp Life | 2,000 hour life (average) |
| Dimensions | 8" (197 mm.) Tall × 10" (257 mm.) Wide × 14" (360 mm.) deep |
| Weight | 14.9 lbs/6.7 kg. |
| Power Requirements | 90–240 V, 50–60 Hz., autoranging, power loop-thru |
| Environment | Temperature: Operation: 5° C., 41° F.–95° F. Storage: –10° C. to 60° C., 14° F.–140° F. Humidity: Operation: 20% to 80% Storage: 20% to 80% |

With respect to the various modes of operation supported by these two projectors, Table 3 provides the relevant specifications.

TABLE 3

Supported Modes for Microtek MVP700s/800x

| Mode Name(s) Used | Horiz. Res. | Vert. Res. | H(kHz) | V(Hz) |
|---|---|---|---|---|
| TV Video Modes | | | | |
| NTSC TV Mode | 700 | 525 | 15.7 kHz | 60 |
| PAL TV mode | 700 | 625 | 15.6 kHz | 50 |
| VGA Modes | | | | |
| VGA Text | 720 | 400 | 37.9 kHz | 85 Hz |
| VESA Modes | | | | |
| VGA60 | 640 | 480 | 31.5 khz | 60 Hz |
| VGA72 | 640 | 480 | 37.9 kHz | 72 Hz |
| VGA75 | 640 | 480 | 37.5 kHz | 75 Hz |
| VGA85 | 640 | 480 | 43.3 kHz | 85 Hz |
| SVGA56 | 800 | 600 | 35.1 kHz | 56 Hz |
| SVGA60 | 800 | 600 | 37.9 kHz | 60 Hz |
| SVGA72 | 800 | 600 | 48.1 kHz | 72 Hz |
| SVGA75 | 800 | 600 | 46.9 kHz | 75 Hz |
| SVGA85 | 800 | 600 | 53.7 kHz | 85 Hz |
| XGA60 | 1024 | 768 | 48.4 kHz | 60 Hz |
| XGA70 | 1024 | 768 | 56.5 kHz | 70 Hz |
| XGA75 | 1024 | 768 | 60.0 kHz | 75 Hz |
| XGA85 | 1024 | 768 | 68.7 kHz | 85 Hz |
| SXGA60* | 1280 | 1024 | 64.0 kHz | 60 Hz |
| MAC Modes | | | | |
| Mac 13 | 640 | 480 | 35.0 kHz | 66.667 Hz |
| Mac 16 | 832 | 624 | 49.7 kHz | 74.6 Hz |
| Mac 19 | 1024 | 768 | 40.2 kHz | 74.94 Hz |
| Mac 1960 | 1024 | 768 | 48.2 kHz | 59.28 Hz |
| Mac 21* | 1152 | 870 | 68.7 kHz | 75.06 Hz |

Both of these projectors include a conventional control panel, not shown. In the preferred embodiment projectors, the control panel is located on the top of the unit. As described above, these LCD projectors are of conventional design.

Figures 19A, 19B:
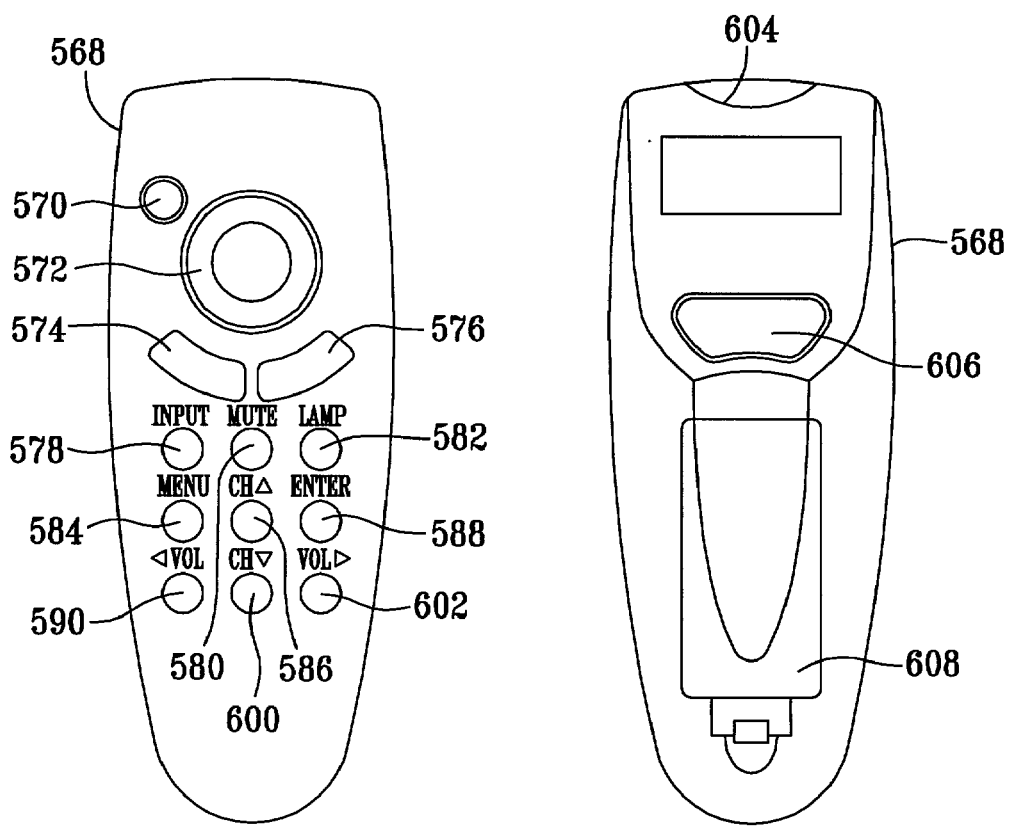
FIG. 19A is an illustration of a remote control pointer device that enables the scanner of the present scanner projection system to interact with the multimedia projector.
FIG. 19B shows the bottom view of the FIG. 19A remote control pointing device.

With reference to FIGS. 19A and 19B, the remote control 568 for the LCD projector 510 will be described. FIG. 19A shows the top view of the controller 568. The controller 568 enables the user to interact with the projector 510 on projector 510's onscreen display and customize various operations. The remote controller also includes features for the laser pointer and, when used with a Windows® based operating system, functions as a remote mouse. The laser pointer is activated at laser pointer button 570. The remote mouse curser button, which functions as a mouse curser when used with a Windows® based operating system, is shown at 572. Left and right click mouse buttons 574 and 576, respectively, are also shown, for use as these functions when used with a Windows® based operating system. Other conventional functions may be controlled by the controller 568 with input button 578, mute control button 580, lamp control button 582, menu selection control 584, channel increase control 586, enter function 588, volume decrease control 590, channel decrease control 600, and volume increase control 602.

With reference to FIG. 19B, the bottom view of the remote control 568 is shown. IR transmitter 604 is shown at the top. Additional control button 606 is shown near the middle of the remote control. Control 606 functions as does the left mouse click button for a Windows® based system. Battery compartment 608 is shown near the lower part of the controller.

Figure 20:
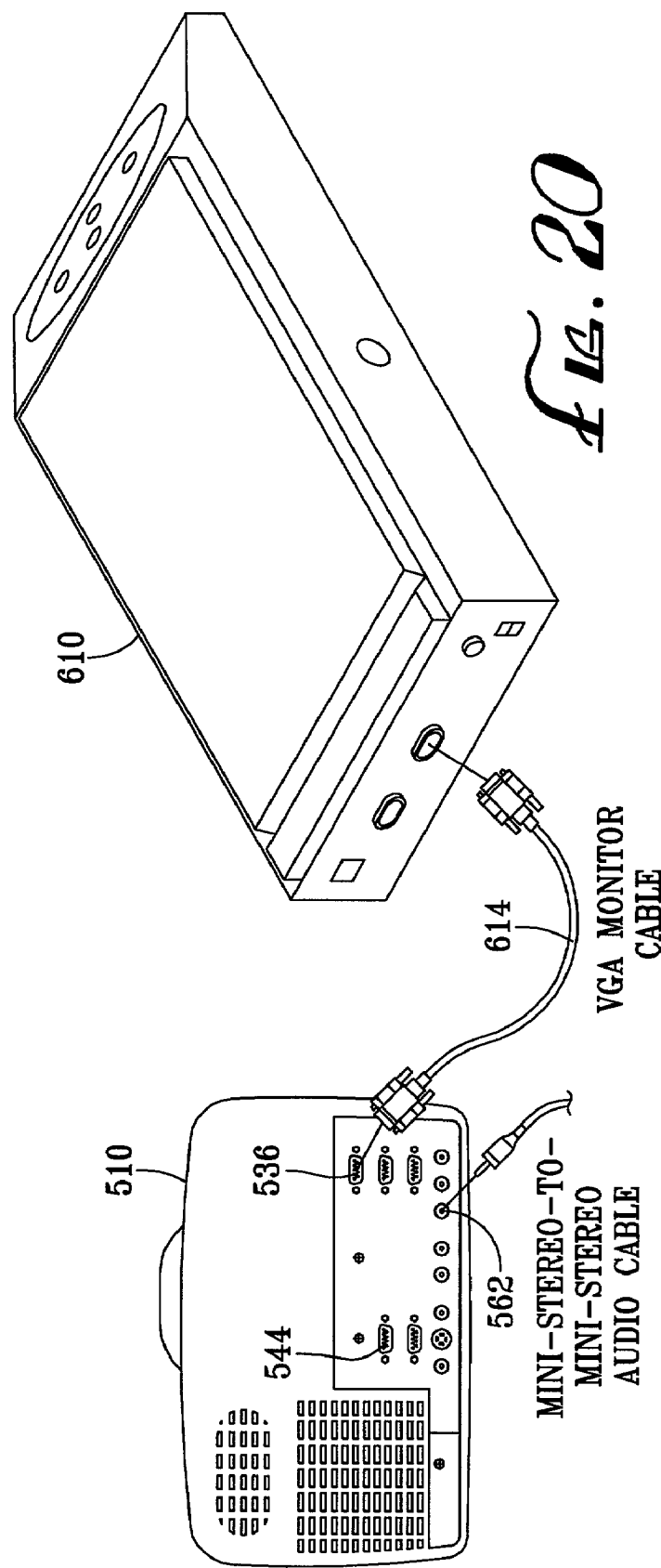
FIG. 20 illustrates a typical connection between the scanner and the multimedia projector of the present scanner projection system.

With reference to FIG. 20, a typical scanner projection system arrangement is illustrated. In the FIG. 20 schematic, a scanner 610 is shown with a VGA monitor cable output 614. The scanner 610, as shown in FIG. 20, may be any of the previously described scanners, provided that they are stand alone scanners having a central processing unit of at least a 486 capability, and having the adaptations as described elsewhere in the specification, for providing output to an LCD type projector 510. The VGA monitor cable 614 are connected to the corresponding inputs 536, and 562, as described above, for the LCD projector 510. In this regard, and in general, if the computer was connected to PC 1 in, the related connected channels should also be PC 1 audio in and mouse 1 input connectors. The connectors should not be connected across channels such as PC 1 in, PC 2 audio and so forth. In order to utilize the projector 510s internal, amplified stereo speakers, the preferred mini-stereo-to-mini-stereo audio cable should be connected to the appropriate PC 1 or PC 2 audio in connector at the rear of the projector 510. The other end of the cable should be connected to the audio output connector of the IBM-compatible lap top or notebook computer.

If the remote mouse feature is desired for use with the multimedia projector's remote control mouse, then it is also necessary to connect to the serial mouse cable.

Figure 21:
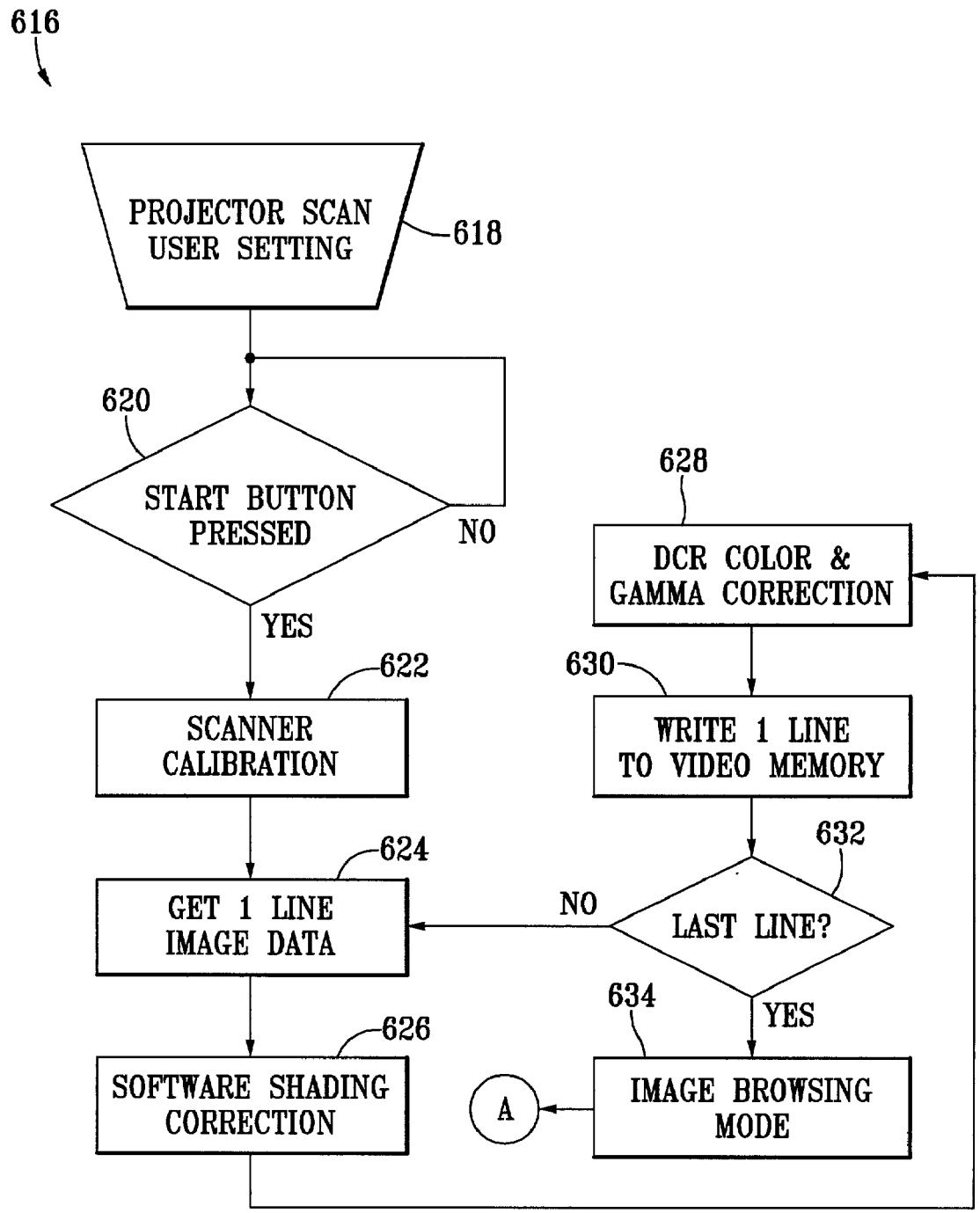
FIG. 21 is a flow chart illustrating programming steps used in the present scanner projection system during operation.

Referring to FIG. 21, a flow chart 616 illustrating programming steps used in the present scanner projector system during operation will be described. Each of the blocks in the flow chart 616 represent a software routine, or a series of software routines, which are available as conventional software, and/or readily generated using conventional programming techniques.

Image digital data processing commences with user selection of settings for the projector scan 618 as previously described and subsequent actuation by depression of the scanner start button 620. Once the processing has commenced the scanner is calibrated by operation of one or a series of calibration routines 622. Following calibration one line of image digital data 624 is acquired by the digital camera and processed sequentially by one or a series of shading correction routines 626 and one or a series of DCR color and gamma correction routines 628, following which the one line of image digital data is written to video memory 630.

If the line of image digital data written to video memory 630 is not the last line 632 of the image scan, the next line of image digital data is acquired and processed as aforesaid. This sequence of image digital data acquisition and processing steps is repeated line by line until the last line of the image scan has been acquired at 624, processed at 626 and at 628, and written to video memory at step 630.

As the lines of the image scan digital data are written to video memory 630, the image digital data stored in video memory 630 is projected onto the screen 512 via LCD projector 510 via a VGA or SVIDEO output 508. Once the completed image digital data have been stored and displayed, the image is available to the image browsing function 634 via one or a series of routines which permits user selection of the displayed image scale, browsing and centering of any selected region of the display image 662, as further described.

Figure 22:
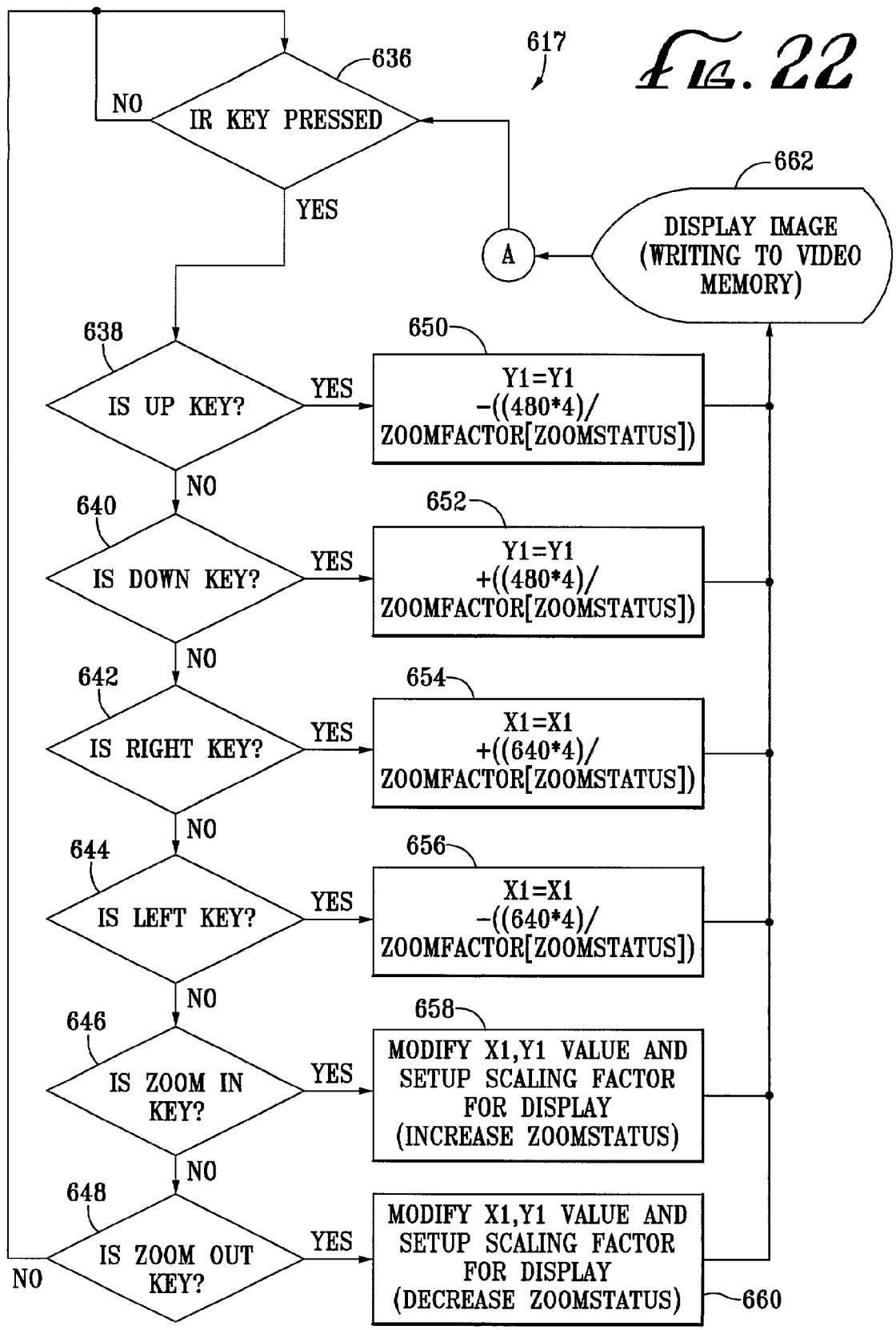
FIG. 22 is a flow chart illustrating various programming steps used in changing the scaling factor for the size of the image displayed during use of the present scanner projection system invention.

Referring to FIG. 22, flow chart 617 illustrating the various programming steps used in changing the scaling factor for the size of the image display and for browsing and/or centering a region of the displayed image will be described. Each diamond symbol in the flow chart 617 represents a user operation of a key of the IR Remote Control 514 and each block represents a software routine, or a series of software routines, which are available as conventional software, and/or readily generated using conventional programming techniques. Changing the displayed image 662 is initiated by user depression of the various keys of the IR Remote Control 514. A software routine 636, or a series of software routines, query whether a key of the IR Remote Control 514 is actuated. If a key of the IR Remote Control 514 is actuated a series of software routines 638, 640, 642, 644, 646 and 648 query which key has been actuated. If the IR Remote Control 514 up key 522 is actuated, software routine 638, or a series of software routines, initiate operation of software routine 650, or a series of software routines, to change the vertical position of the displayed image 662 pursuant to an algorithm of the type Y1 equals Y1−((480*4)/ZOOMFACTOR [ZOOMSTATUS]) where Y represents the vertical axis, as is conventional.

If the IR Remote Control 514 down key 526 is actuated, software routine 640, or a series of software routines, initiate operation of software routine 652 or a series of software routines, to change the vertical position of the displayed image 662 pursuant to an algorithm of the type Y1 equals Y1+((480*4)/ZOOMFACTOR [ZOOMSTATUS]), where Y again represents the vertical axis, as is conventional.

If the IR Remote Control of 514 right key 524 is actuated, software routine 642, or a series of software routines, initiates operation of software routine 654, or a series of software routines, to change the horizontal position of the displayed image 662 pursuant to an algorithm of the type X1 equals X1+((640*4)/ZOOMFACTOR [ZOOMSTATUS]), where X represents the horizontal axis, as is conventional.

If the IR Remote Control 514 left key 520 is actuated, software routine 644, or a series of software routines, initiates operation of software routine 656, or a series of software routines, to change the horizontal position of the displayed image 662 pursuant to an algorithm of the type X1 equals X1−((640*4)/ZOOMFACTOR [ZOOMSTATUS]), where X again represents the horizontal axis, as is conventional.

If the IR Remote Control 514 zoom in key 518 is actuated, software routine 646, or a series of software routines, initiates operation of software routine 658, or a series of software routines, to change the scale of the displayed image 662 pursuant to an algorithm of the type which modifies the horizontal X1 and the vertical Y1 values of the displayed image 662 and which further sets up a scaling factor for display of a smaller portion of the image digital data stored in video memory 630 and displays a smaller portion of the stored image digital data than previously displayed, resulting in enlargement of that portion of the image which is displayed.

If the IR Remote Control 514 zoom out key 516 is actuated, software routine 648, or a series of software routines, initiate operation of software routine 660, or a series of software routines, to change the scale of the displayed image 662 pursuant to an algorithm of the type which modifies the horizontal X1 and vertical Y1 values of the displayed image 662 and which further sets up a scaling factor for display of a larger portion of the image digital data stored in video memory 630 and displays a larger portion of the stored image than previously displayed, resulting in a reduction of that portion of the image which is displayed.

Eighth Preferred Embodiment

Figure 23:
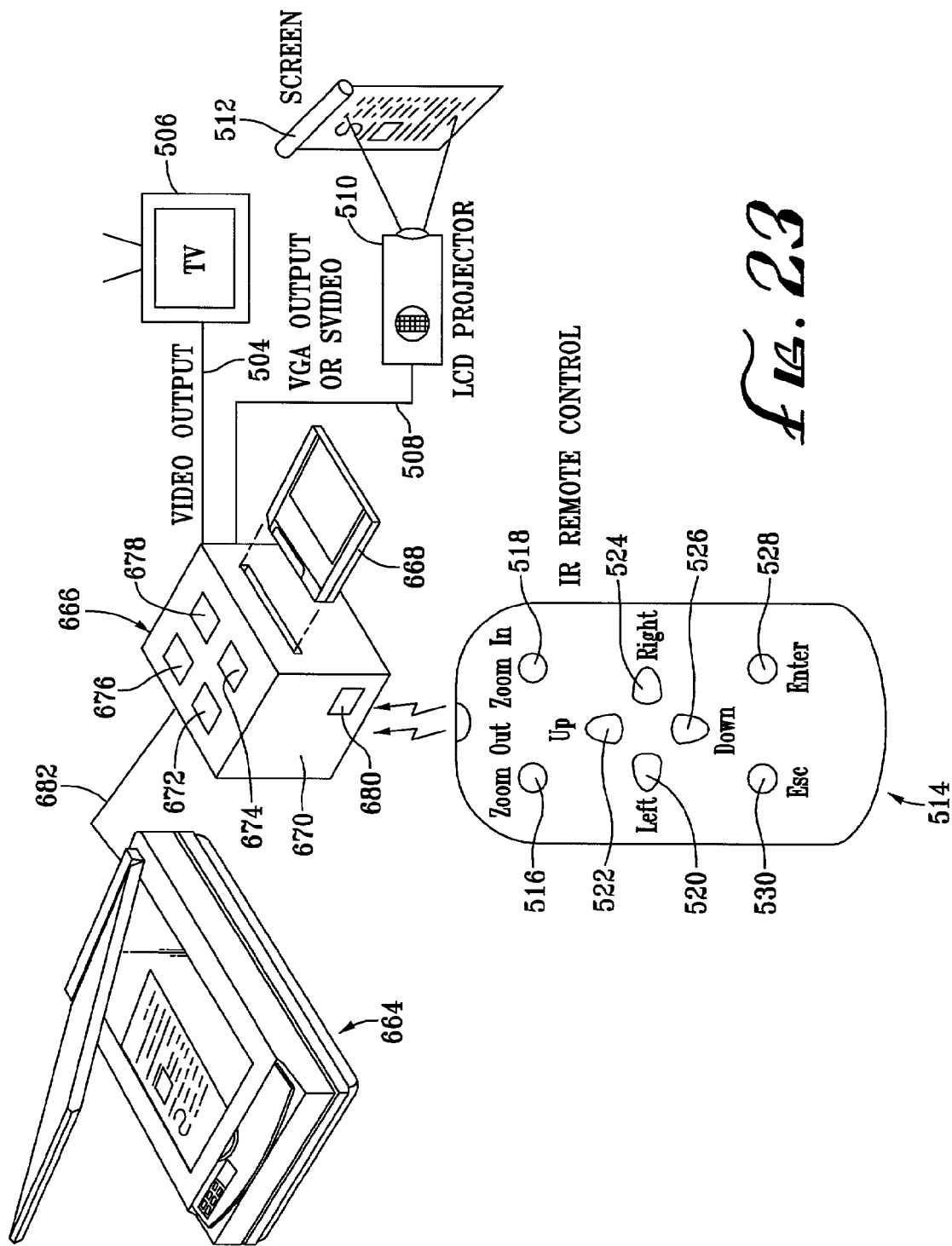
FIG. 23 is a schematic view of an eighth embodiment of the present invention, showing a stand alone CPU unit adapted for receiving direct output from a stand alone scanner, and providing input for video, for an LCD projector and providing for remote control.

Referring to FIG. 23, an eighth preferred embodiment 666 of the present invention is a stand alone central processing unit (CPU) operationally connected to and adapted for receiving direct output 682 from a conventional stand alone scanner, and providing input for display by video or by an LCD projector, as well as providing for remote control. The stand alone CPU includes the housing 670 containing the central processing unit operationally connected with conventional removable digital data storage media 668 also contained within said housing 670. The housing also provides a plurality of control buttons, preferably located on the top surface of the housing, including a power (on/off) button 672, an erase function button 674, an advance next image control button 676, and a raw data compression button 678. The housing 670 also contains an infrared sensor 680 operationally connected to the central processing unit and removable digital data storage media which permits control via IR Remote Control unit 514 of the image displayed on the screen 512 by the LCD projector 510 through the VGA or SVIDEO output 508 from the central processing unit. Alternatively, the infrared remote control 514 may control the image displayed by a television monitor 506 to which the central processing unit is operationally connected via video output 504.

The image digital data processed by the central processing unit is written to video memory and stored on the removable digital data storage media 668 as previously described with respect to other preferred embodiments of the invention. In this embodiment, the preferred removable digital data storage media is a conventional 3.5 inch floppy disk, with a Zip-Drive, holding approximately 100 megabytes of data, being also preferred. The various control features of the IR Remote Control unit 514 together with the software algorithms previously described with respect to FIG. 21 and FIG. 22 may be used to change the scale of the image displayed upon the screen 512 or a television monitor 506 and/or to browse different areas of the image digital data.

It will be understood that certain features and subcombinations are of utility and may be employed without reference to other features and subcombinations as they are outlined within the description above and within the claims appended hereto. While the preferred embodiments and application of the invention have been described, it is apparent to those skilled in the art that the objects and features of the present invention are only limited as set forth in the claims appended hereto.

We claim:

1. A scanner adapted for creating digital data representative of an object image and projecting said digital data to form a displayed image of a predetermined scale, comprising:
   a housing having a scanning surface thereon;
   a digital camera positioned within said housing; and
   a control system adapted to control scanning of objects placed on said scanning surface and including installed software adapted to convert obtained image data to digital data adapted for transmission to a display device to form said displayed image.

2. The scanner of claim 1 wherein said display device is a television monitor.

3. The scanner of claim 1 further including a removable data storage medium.

4. The scanner of claim 1 wherein said software is adapted to allow changing the scale and/or position of said displayed image.

5. A scanner adapted for creating digital data representative of an object image and projecting said digital data to form a displayed image of a predetermined scale, comprising:
   a housing having a scanning surface thereon;
   a digital camera positioned within said housing; and
   a control system adapted to control scanning of objects placed on said scanning surface and including installed software adapted to convert obtained image data to digital data adapted for transmission to a display device to form said displayed image,
   wherein said display device is an LCD projector.

6. A scanner projection system adapted for creating digital data representative of an object image and projecting said digital data to form a displayed image of a predetermined scale, comprising:
   a stand alone scanner adapted to scan an object image, to convert the object image to digital data representative of the object image, and to transmit the digital data to a central processing unit;
   a stand alone central processing unit (CPU) not including a display device, said unit adapted to receive digital data from a scanner, containing installed software to process the digital data for storage and/or display at a predetermined scale, and adapted to transmit the digital data to a storage medium and/or to a display device; and
   a stand alone display device adapted to receive digital data representative of the object image from the CPU and to convert the digital data to a displayed image of predetermined scale.

7. The scanner projection system of claim 6 wherein the scanner is adapted for creating an object image from a reflective scanning platform and/or a transmissive scanning platform.

8. The scanner projection system of claim 6 further including a digital data storage medium.

9. The scanner projection system of claim 6 further including removable digital data storage medium.

10. The scanner projection system of claim 6 wherein the display device is an LCD projector which forms a projected image upon a screen.

11. A scanner projection system adapted for creating digital data representative of an object image and projecting said digital data to form a displayed image of a predetermined scale, comprising:
   a stand alone scanner adapted to scan an object image, to convert the object image to digital data representative of the object image, and to transmit the digital data to a central processing unit;
   a stand alone central processing unit (CPU) not including a display device, said unit adapted to receive digital data from a scanner, containing installed software to process the digital data for storage and/or display at a predetermined scale, and adapted to transmit the digital data to a storage medium and/or to a display device; and
   a stand alone display device adapted to receive digital data representative of the object image from the CPU and to convert the digital data to a displayed image of predetermined scale,
   wherein the display device is a television.

12. A scanner projection system adapted for creating digital data representative of an object image and projecting said digital data to form a displayed image of a predetermined scale, comprising:

a stand alone scanner adapted to scan an object image, to convert the object image to digital data representative of the object image, and to transmit the digital data to a central processing unit;

a stand alone central processing unit (CPU) not including a display device, said unit adapted to receive digital data from a scanner, containing installed software to process the digital data for storage and/or display at a predetermined scale, and adapted to transmit the digital data to a storage medium and/or to a display device; and a stand alone display device adapted to receive digital data representative of the object image from the CPU and to convert the digital data to a displayed image of predetermined scale, wherein the CPU is further adapted to receive signals from an infrared (IR) remote control device, to convert the infrared signals to digital data representative of the infrared signals, containing software to process said digital data to change the digital data representative of the object image transmitted to the display device to alter the scale and/or position of the portion of the object image displayed.

13. A method of displaying a scanned image comprising:

scanning an image in a stand alone flatbed scanner containing a central processing unit, digital data storage medium, installed software adapted to convert the obtained image to digital data adapted for transmission directly to a display device; and displaying said image digital data upon said display device to form an image.

14. The method of claim 13 wherein the digital data storage medium is removable.

15. A method of displaying a scanned image, comprising:

scanning an image in a stand alone flatbed scanner containing a central processing unit, digital data storage medium, installed software adapted to convert the obtained image to digital data adapted for transmission to a display device; and displaying said image digital data upon said display device to form an image, wherein the installed software is further adapted to allow changing a displayed image scale.

16. A method of displaying a scanned image, comprising:

scanning an image in a stand alone flatbed scanner containing a central processing unit, digital data storage medium, installed software adapted to convert the obtained image to digital data adapted for transmission to a display device; and displaying said image digital data upon said display device to form an image, wherein the installed software is further adapted to allow the scale of the displayed image to be changed by an infrared remote control device.

17. A method of displaying a scanned image, comprising:

scanning an image in a stand alone flatbed scanner containing a central processing unit, digital data storage medium, installed software adapted to convert the obtained image to digital data adapted for transmission to a display device; and displaying said image digital data upon said display device to form an image, wherein the installed software is further adapted to allow the portion of the image displayed to be shifted vertically and horizontally.

18. A method of displaying a scanned image, comprising:

scanning an image in a stand alone flatbed scanner containing a central processing unit, digital data storage medium, installed software adapted to convert the obtained image to digital data adapted for transmission to a display device; and displaying said image digital data upon said display device to form an image, wherein the installed software is further adapted to allow the scale of the displayed image to be shifted vertically and horizontally by an infrared remote control device.

19. A method of displaying a scanned image, comprising:

scanning an image in a stand alone flatbed scanner containing a central processing unit, digital data storage medium, installed software adapted to convert the obtained image to digital data adapted for transmission to a display device; and displaying said image digital data upon said display device to form an image, wherein the image display device is a television monitor.

20. A method of displaying a scanned image, comprising:

scanning an image in a stand alone flatbed scanner containing a central processing unit, digital data storage medium, installed software adapted to convert the obtained image to digital data adapted for transmission to a display device; and displaying said image digital data upon said display device to form an image, wherein the image display device is an LCD projector which forms a projected image upon a screen.

\* \* \* \* \*